(12) United States Patent  
Pedersen et al.

(10) Patent No.: US 10,915,680 B2  
(45) Date of Patent: Feb. 9, 2021

(54) LOCAL CONTROL OF DESIGN PATTERNS ON SURFACES FOR ENHANCED PHYSICAL PROPERTIES

(71) Applicant: Dassault Systemes Simulia Corp., Johnston, RI (US)

(72) Inventors: Claus Bech Wittendorf Pedersen, Hamburg (DE); Nikolai Gerzen, Karlsruhe (DE); Martin-Pierre Hugo Schmidt, Velizy-Villacoublay (FR)

(73) Assignee: Dassault Systemes Simulia Corp., Johnston, RI (US)

(*) Notice: Subject to any disclaimer, the term of this patent is extended or adjusted under 35 U.S.C. 154(b) by 292 days.

(21) Appl. No.: 16/230,130

(22) Filed: Dec. 21, 2018

(65) Prior Publication Data

US 2020/0201951 A1    Jun. 25, 2020

(51) Int. Cl.
  *G06F 30/23* (2020.01)
  *G06F 119/18* (2020.01)
  *G06F 111/10* (2020.01)

(52) U.S. Cl.
  CPC .......... *G06F 30/23* (2020.01); *G06F 2111/10* (2020.01); *G06F 2119/18* (2020.01)

(58) Field of Classification Search
  None
  See application file for complete search history.

(56) References Cited

U.S. PATENT DOCUMENTS

2006/0078194 A1* 4/2006 Fradkin ............... G06T 7/0012  
                                                    382/154  
2011/0313737 A1* 12/2011 Hadj-Sassi ........... G01V 99/005  
                                                    703/2

FOREIGN PATENT DOCUMENTS

EP        3404563 A1    11/2018

OTHER PUBLICATIONS

Bendsoe, et al., "Topology Optimization, Theory, Methods and Applications," Springer, Engineering Online Library, 15 pages, 2003.

(Continued)

*Primary Examiner* — Craig C Dorais  
(74) *Attorney, Agent, or Firm* — Hamilton, Brook, Smith & Reynolds, P.C.

(57) ABSTRACT

Embodiments automatically determine optimized designs for manufacturing real-world objects. An embodiment begins with defining a finite element model comprised of a plurality of elements that represents a real-world object. Next, equilibriums and design responses of the object in response boundary conditions are determined, which includes calculating a local volume constraint for a given element of the finite element model. Then, design response sensitivities of the object in response to the boundary conditions are determined, which includes differentiating the calculated local volume constraint to determine sensitivity of a sizing design variable. In turn, the model is iteratively optimized with respect to the sizing design variable using the determined equilibriums and the determined design responses, including the calculated local volume constraint, and the determined design response sensitivities, including the determined sensitivity of the sizing design variable to determine an optimized value of the sizing design variable.

20 Claims, 18 Drawing Sheets

(56) References Cited

OTHER PUBLICATIONS

Clausen, et al., "Exploiting Additive Manufacturing Infill in Topology Optimization for Improved Bucking Load," Section of Solid Mechanics, Department of Mechanical Engineering, Technical University of Denmark, Lyngby DK-2800, Denmark, Engineering, vol. 2, pp. 250-257, 2016.

Tejani, et al., "Size, shape, and topology optimization of planar and space trusses using mutation-based improved metaheuristics," Journal of Computational Design and Engineering, vol. 5, pp. 198-214, 2018.

Wills, "NX 12 Topology Optimization for Designers," Siemens AG, https://www.plm-europe.org/admin/presentations/2017/2003_PLMEurope_24.10.17-13-30_GUY-WILLS_SPLMM_topology_optimization_for_designers.pdf, 47 pages, 2017.

Wu, et al., "Infill Optimization for Additive Manufacturing—Approaching Bone-like Porous Structures," IEEE Transaction on Visualization and Computer Graphics, vol. 24, No. 2, pp. 1127-1140, downloaded on Mar. 14, 2018.

Wu, et al., "Minimum Compliance Topology Optimization of Shell-Infill Composites for Additive Manufacturing," Computer Methods in Applied Mechanics and Engineering, 21 pages, Aug. 7, 2017.

Balm, et al., "Implementation of high speed machining in thin-walled aircraft integral elements," Open Eng., vol. 8, pp. 162-169, downloaded Dec. 18, 2018.

ASME AM3D Training, "Design Demonstration Part 2," https://www.youtube.com/watch?v=921geNglY5A, published Oct. 27, 2016.

ASME AM3D Training, "Rules of Thumb," https://www.youtube.com/watch?v=Vjda67dNgDo, published Oct. 27, 2016.

Wu, J., et al., "Infill Optimization for Additive Manufacturing-Approaching Bone-like Porous Structures," Infill optimization for Additive Manufacturing, Nov. 19, 2016, 14 pages.

* cited by examiner

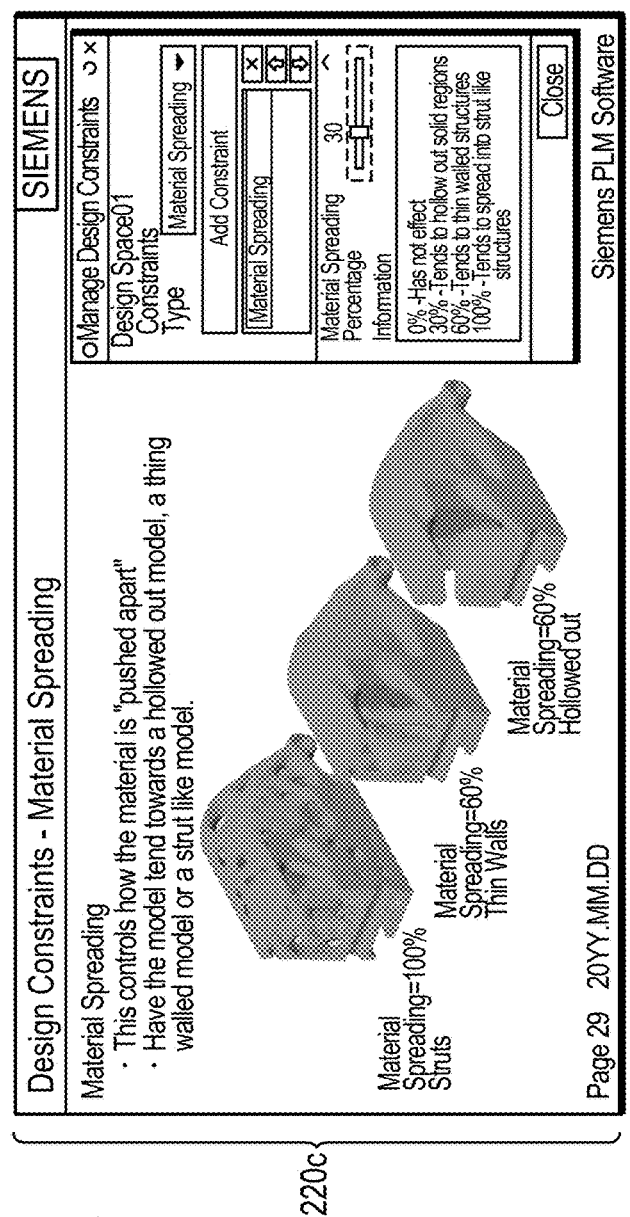
FIG. 2A
FIG. 2C
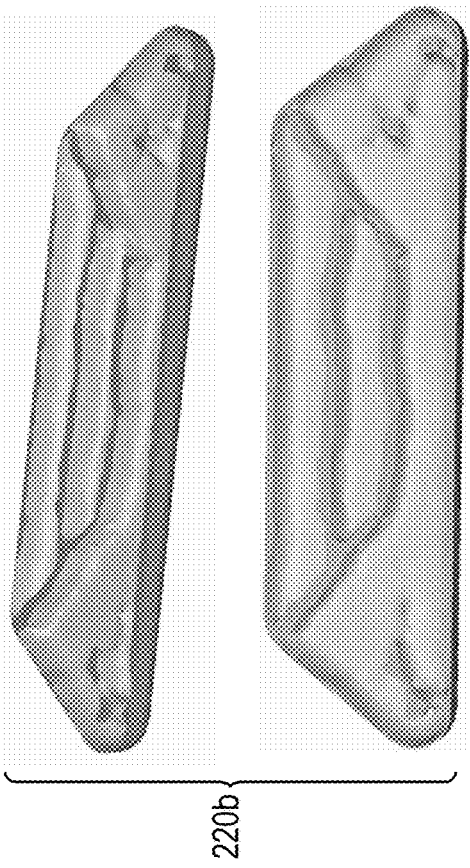
FIG. 2B

440a

440b

770 {

Local Relative mass: $mass_{REL,i} = \dfrac{\sum_{e=1}^{Nel_{radius}} v_e \rho_e}{\sum_{e=1}^{Nel_{radius}} v_{original,e}}$ Local Absolute mass: $mass_{ABS,i} = \sum_{e=1}^{Nel_{radius}} v_e \rho_e$ Factors:
- $i$ element ID
- $e$ element ID
- Number of elements $Nel_{radius}$ for element $i$ is defined by the elements having their elemental centroid contained inside the radius $R$ defined in Fig. 5A.
- $v_e$ elemental volume (can be a design variables, e.g. in sizing)
- $\rho_e$ elemental density (can be a design variables, e.g. in topology)
- $v_{original,e}$ elemental volume of original model (not a design variable)

FIG. 7

$$\text{Maximum Local Relative mass: } mass_{REL,MAX} = |mass_{REL,i}|_{i=1, i=2,\ldots, i=Nel} \approx \left(\frac{1}{Nel}\sum_{i=1}^{Nel} mass_{REL,i}^{Q}\right)^{\frac{1}{Q}}$$

$$\text{Maximum Local Absolute mass: } mass_{ABS,MAX} = |mass_{ABS,i}|_{i=1, i=2,\ldots, i=Nel} \approx \left(\frac{1}{Nel}\sum_{i=1}^{Nel} mass_{ABS,i}^{Q}\right)^{\frac{1}{Q}}$$

880

Factors:
- $i$ element ID
- $Nel$ Number of elements over which the maximum mass should be calculated (see Fig 5B). Typically, the entire component or a sudden partition of the component.
- Q norm for p-mean norm. Typically, between 4 to 12.

FIG. 8

Maximum Local Relative mass: $\dfrac{dmass_{REL,MAX}}{dx_j} \approx \left(\dfrac{1}{Nel}\sum\limits_{i=1}^{Nel} mass_{REL,i}^{Q}\right)^{\frac{1-Q}{Q}} \left(\dfrac{1}{Nel}\sum\limits_{i=1}^{Nel} mass_{REL,i}^{Q-1}\dfrac{d(mass_{REL,i})}{dx_j}\right)$ Maximum Local Absolute mass: $\dfrac{dmass_{ABS,MAX}}{dx_j} \approx \left(\dfrac{1}{Nel}\sum\limits_{i=1}^{Nel} mass_{ABS,i}^{Q}\right)^{\frac{1-Q}{Q}} \left(\dfrac{1}{Nel}\sum\limits_{i=1}^{Nel} mass_{REL,i}^{Q-1}\dfrac{d(mass_{ABS,i})}{dx_j}\right)$

WHERE:

Design variable topology: $\dfrac{d(mass_{REL,i})}{dx_j} = v_j \boxed{\dfrac{d\rho_j}{dx_j}}_{991a}$ AND $\dfrac{d(mass_{ABS,i})}{dx_j} = v_j \boxed{\dfrac{d\rho_j}{dx_j}}_{991b}$ ⟶ Choice of topology design variables Design variable sizing: $\dfrac{d(mass_{REL,i})}{dx_j} = \dfrac{\sum_{e=1}^{Nel_{radius}} \boxed{\dfrac{dv_j}{dx_j}}_{992a} \rho_j}{v_{original,e}}$ AND $\dfrac{d(mass_{ABS,i})}{dx_j} = \sum\limits_{e=1}^{Nel_{radius}} \boxed{\dfrac{dv_j}{dx_j}}_{992b} \rho_j$ ⟶ Choice of sizing design variables Factors:
- $x$ design variable
- $j$ element ID
- $i$ and $e$ element ID
- $Nel$ Number of elements.
- $v_e$ elemental volume
- $\rho_e$ elemental density
- $v_{original,e}$ elemental volume of original model

Classic Global Relative mass: $mass_{Global,REL} = \dfrac{\sum_{e=1}^{Nel} v_e \rho_e}{\sum_{e=1}^{Nel} v_{original,e}}$ Classic Global Absolute mass: $mass_{Global,ABS} = \sum_{e=1}^{Nel} v_e \rho_e$ Factors:
- $e$ element ID
- $Nel$ Number of elements over which the maximum mass should be calculated (see Fig 5B). Typically, the entire component or a sudden partition of the component.
- $v_e$ elemental volume (can be a design variable, e.g. in sizing)
- $\rho_e$ elemental density (can be a design variable, e.g. in topology)
- $v_{original,e}$ elemental volume of original model (not a design variable)

FIG. 10

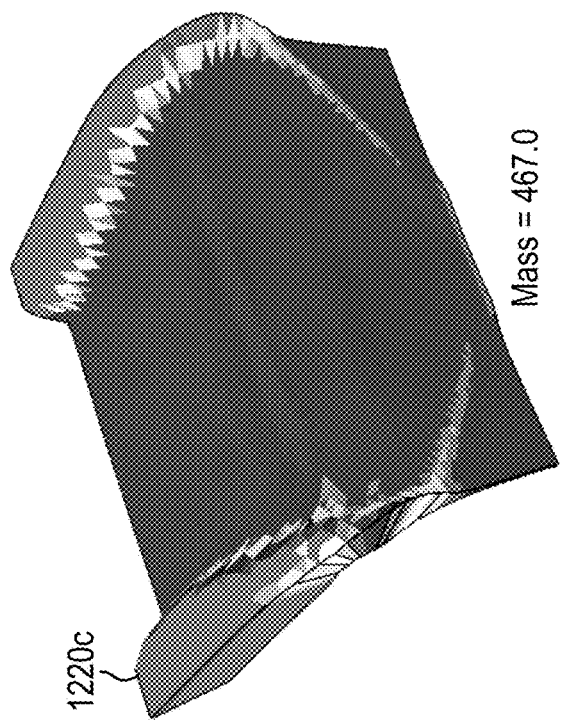
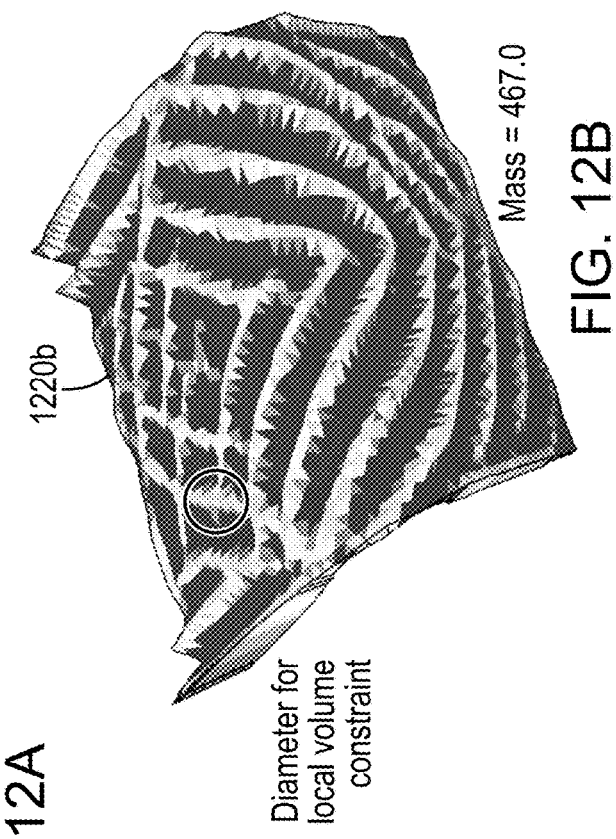
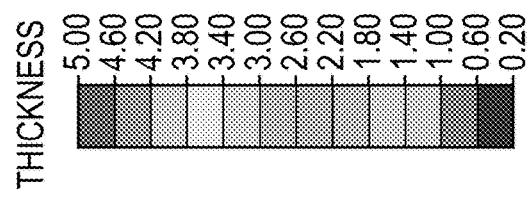
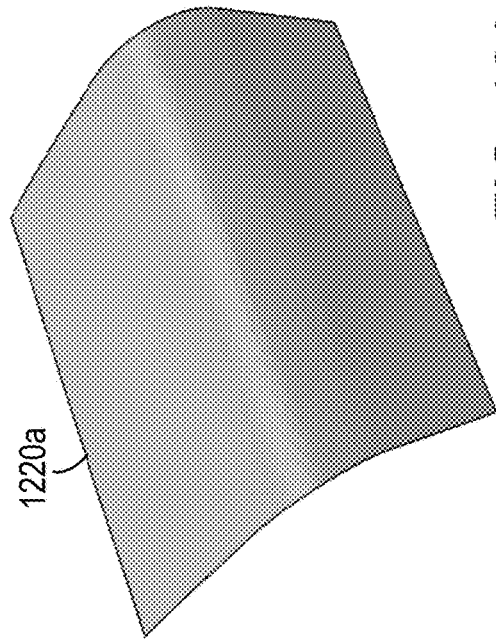
FIG. 12A
FIG. 12B
FIG. 12C

LOCAL CONTROL OF DESIGN PATTERNS ON SURFACES FOR ENHANCED PHYSICAL PROPERTIES

FIELD OF INVENTION

Embodiments of the invention generally relate to the field of computer programs and systems, and specifically, to the fields of computer aided design (CAD), computer aided engineering (CAE), modeling, simulation, optimization, manufacturing, and automated product design based upon optimization and simulation.

BACKGROUND

A number of systems and programs are offered on the market for the design of parts or assemblies of parts. These so called CAD systems allow a user to construct and manipulate complex three-dimensional models of objects or assemblies of objects. CAD systems thus provide a representation of modeled objects using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element model (FEM). The terms finite element analysis (FEA) model, FEM, finite element mesh, and mesh are used interchangeably herein. A FEM typically represents a CAD model, and thus, may represent one or more parts or an entire assembly. A FEM is a system of points called nodes which are interconnected to make a grid, referred to as a mesh.

A FEM may be programmed in such a way that the FEM has the properties of the underlying object or objects that it represents. When a FEM, or other such CAD or CAE model is programmed in such a way, it may be used to perform simulations of the object that the model represents. For example, a FEM may be used to represent the interior cavity of a vehicle, the acoustic fluid surrounding a structure, and any number of real-world objects and systems. When a given model represents an object and is programmed accordingly, it may be used to simulate the real-world object itself. For example, a FEM representing a stent may be used to simulate the use of the stent in a real-life medical setting.

CAD, CAE, and FEM models may be used to improve the design of the objects that the models represent. Design improvements may be identified through use of optimization techniques that run a series of simulations in order to identify changes to the design of the model and thus, the underlying object that the model represents.

SUMMARY

While computer based optimization methods for designing real-world objects exist, these existing methods often result in designs that are impractical for manufacturing. Embodiments of the present invention provide improvements to automated real-world object design methods and systems based upon optimization and simulation by providing computer based design functionality that determines optimized object designs for manufacturing that are in accordance with other, e.g., physical, requirements.

One such example embodiment provides a computer-implemented method of automatically determining an optimized design for manufacturing a real-world object that begins by defining, in memory of a processor, a finite element model representing a real-world object where, the finite element model is comprised of a plurality of elements. Such an example embodiment continues by determining equilibriums and design responses, i.e., design response values, of the real-world object in response to a set of boundary conditions using the finite element model. In such an embodiment, determining the design responses includes calculating a local volume constraint for a given element of the plurality of elements of the finite element model wherein, the local volume constraint is a design response for the given element of the plurality of elements. According to an embodiment, the local volume constraint is defined by a maximum local relative mass or a maximum local absolute mass. In such an embodiment, the maximum local mass represents a maximum amount of material allowable for a given local neighborhood around the given element. Next, design response sensitivities of the real-world object in response to the set of boundary conditions are determined using the finite element model. Determining design response sensitivities includes differentiating the calculated local volume constraint to determine sensitivity of a sizing design variable for the given element. According to an embodiment, the local volume constraint is differentiated with respect to a sizing design variable. In an example embodiment, an example sizing design variable is thickness, which is thickness of the considered element. In turn, the finite element model representing the real-world object is iteratively optimized with respect to the sizing design variable using the determined equilibriums and the determined design responses, including the calculated local volume constraint, and the determined design response sensitivities, including the determined sensitivity of the sizing design variable. The iterative optimizing results in an optimized value of the sizing design variable for the given element of the finite element model. To continue, such an embodiment further includes automatically updating properties of the given element of the finite element model to reflect the optimized value of the sizing design variable, thereby creating an optimized model of the real-world object for manufacturing. It is noted that while herein, functionality is described as being performed in relation to single elements, variables, etc., embodiments are not so limited, and may be implemented in relation to any number of elements and variables. For example, determining design response sensitivities may include differentiating the calculated local volume constraint with respect to multiple sizing design variables. Similarly, embodiments may determine properties as described herein for multiple elements of the finite element model. In such an embodiment, the functionality as described herein in regard to the "given element" is performed in parallel with regard to any number of elements and in this way, properties of each of the considered elements are updated to reflect respective optimized values of the sizing design variable that are determined for each considered element.

In embodiments, the finite element model may be any such finite element model as is known in the art. Further, according to another embodiment, the finite element model is a sheet model of a surface of the real-world object.

An embodiment may also determine optimized values for the sizing design variable(s) for multiple elements of the finite element model. In this way, embodiments can determine optimized designs for manufacturing the entire real-world object. Such an example embodiment further includes calculating a local volume constraint for each of multiple elements of the finite element model where, each local volume constraint is a design response for a respective element of the plurality of elements and differentiating each calculated local volume constraint to determine sensitivity with respect to the sizing design variable(s) for each of the multiple elements. To continue, in such an embodiment, the finite element model is iteratively optimized using the determined equilibriums and the determined design responses, including the calculated local volume constraint for each of the multiple elements, and the determined design response sensitivities, including the determined sensitivity with respect to the sizing design variable(s) of each of the multiple elements, in order to determine optimized value(s) of the sizing design variable(s) of each of the multiple elements. In turn, properties of each of the multiple elements are automatically updated to reflect the values of the sizing design variable(s) determined for each of the multiple elements.

According to an embodiment, the local volume constraint includes: a volume constraint, a material density constraint, and a material mass constraint. In another embodiment, the sizing design variable represents at least one of: thickness, lattice structure, and cross sectional dimensions.

In an embodiment, the local volume constraint applies to the given element and other elements of the finite element model within a radius surrounding the given element. In one such embodiment, the other elements are within the radius when elemental centroids of the other elements are within the radius.

Another embodiment further includes causing the real-world object to be manufactured according to the optimized model. In one such embodiment, causing the real-world object to be manufactured includes digitally communicating the optimized model of the real-world object to a manufacturing machine capable of producing the real-world object according to the optimized model.

Yet another embodiment is directed to a system to automatically determine an optimized design for manufacturing a real-world object. An example system embodiment includes a processor and a memory with computer code instructions stored thereon, where, the processor and the memory, with the computer code instructions are configured to cause the system to define, in memory of the processor, a finite element model representing a real-world object wherein, the finite element model is comprised of a plurality of elements. The system is also configured to determine equilibriums and design responses of the real-world object in response to a set of boundary conditions using the finite element model. In such a system embodiment, determining the design responses includes calculating a local volume constraint for a given element of the plurality of elements of the finite element model wherein, the local volume constraint is a design response for the given element of the plurality of elements. The processor and memory, with the computer code instructions, are further configured to cause the system to determine design response sensitivities of the real-world object in response to the set of boundary conditions using the finite element model. Determining design response sensitivities in such an embodiment includes differentiating the calculated local volume constraint to determine sensitivity of a sizing design variable for the given element. Such a system is further configured to iteratively optimize the finite element model representing the real-world object with respect to the sizing design variable using the determined equilibriums and the determined design responses, including the calculated local volume constraint, and the determined design response sensitivities, including the determined sensitivity of the sizing design variable. In such an embodiment, the iteratively optimizing results in determining an optimized value of the sizing design variable for the given element of the finite element model. Further still, the processor and the memory, with the computer code instructions, are further configured to cause the system to automatically update properties of the given element of the finite element model to reflect the optimized value of the sizing design variable, thereby creating an optimized model of the real-world object for manufacturing.

In an embodiment of the system, the finite element model is a sheet model of a surface of the real-world object. According to another embodiment of the system, the local volume constraint includes: a volume constraint, a material density constraint, and a material mass constraint. According to yet another embodiment of the system, the sizing design variable represents at least one of: thickness, lattice structure, and cross-sectional dimensions.

Another embodiment of the system determines an optimized value of the sizing design variable for multiple elements of the finite element model. In such an embodiment of the system, the processor and the memory, with the computer code instructions, are further configured to cause the system to (i) calculate a local volume constraint for each of multiple elements of the finite element model, where each local volume constraint is a design response for a respective element of the plurality of elements and (ii) differentiate each calculated local volume constraint to determine sensitivity with respect to the sizing design variable for each of the multiple elements. Such an embodiment may accumulate the calculated local volume constraints into a single local volume constraint approximating the maximum value in the considered set of constraints which serves as a single representative maximum local volume or maximum local mass constraint. Here mass and volume can be represented by their absolute values or the corresponding relative values, i.e. divided by the maximum possible values. The system, in such an embodiment, is further configured to iteratively optimize the finite element model using the determined equilibriums and the determined design responses, including the calculated local volume constraint for each of the multiple elements, and the determined design response sensitivities, including the determined sensitivity of the sizing design variable for each of the multiple elements (i.e., sensitivity with respect to the sizing design variable of each of the multiple elements), so as to determine an optimized value of the sizing design variable for each of the multiple elements. In turn, such a system embodiment automatically updates properties of each of the multiple elements to reflect the value of the sizing design variable determined for each of the multiple elements.

According to an embodiment of the system, the local volume constraint applies to the given element and other elements of the finite element model within a radius surrounding the given element. According to one such embodiment, the other elements are within the radius when elemental centroids of the other elements are within the radius.

In another embodiment of the system, the processor and the memory, with the computer code instructions, are further configured to cause the system to cause the real-world object to be manufactured according to the optimized model. In one such system embodiment, in causing the real-world object to be manufactured, the processor and the memory, with the computer code instructions, are further configured to cause the system to digitally communicate the optimized model of the real-world object to a manufacturing machine capable of producing the real-world object according to the optimized model.

Yet another embodiment of the present invention is directed to a cloud computing implementation to automatically determine an optimized design for manufacturing a real-world object. Such an embodiment is directed to a computer program product executed by a server, in communication across a network, with one or more clients. In such an embodiment, the computer program product comprises a computer readable medium that embodies or otherwise comprises program instructions, which, when executed by a processor, causes the processor to define, in memory of the processor, a finite element model representing a real-world object, the finite element model being comprised of a plurality of elements. Further, in such a cloud computing environment, the program instructions, when executed, further cause the processor to determine equilibriums and design responses of the real-world object in response to a set of boundary conditions using the finite element model, wherein, determining the design responses includes calculating a local volume constraint for a given element of the plurality of elements of the finite element model and where, the local volume constraint is a design response for the given element of the plurality of elements. Moreover, the program instructions further cause the processor to determine design response sensitivities of the real-world object in response to the set of boundary conditions using the finite element model which includes differentiating the calculated local volume constraint to determine sensitivity of a sizing design variable for the given element. Next, in such a cloud computing embodiment, the program instructions cause the processor to iteratively optimize the finite element model representing the real-world object with respect to the sizing design variable using the determined equilibriums and the determined design responses, including the calculated local volume constraint, and the determined design response sensitivities, including the determined sensitivity of the sizing design variable. In the cloud computing environment, the iterative optimizing results in an optimized value of the sizing design variable for the given element of the finite element model. Further still, in the cloud computing environment, the processor is configured to automatically update properties of the given element of the finite element model to reflect the optimized value of the sizing design variable, thereby creating an optimized model of the real-world object for manufacturing.

In an alternative embodiment of the cloud computing environment, the computer readable medium further comprises program instructions which, when executed by the processor, causes the processor to (i) calculate a local volume constraint for each of multiple elements of the finite element model where, each local volume constraint is a design response for a respective element of the plurality of elements and (ii) differentiate each calculated local volume constraint to determine sensitivity of the sizing design variable for each of the multiple elements. Further, in such an embodiment, the program instructions further cause the processor to iteratively optimize the finite element model using the determined equilibriums and the determined design responses, including the calculated local volume constraint for each of the multiple elements, and the determined design response sensitivities, including the determined sensitivity of the sizing design variable for each of the multiple elements so as to determine an optimized value of the sizing design variable for each of the multiple elements. In turn, the program instructions cause the processor to automatically update properties of each of the multiple elements to reflect the value of the sizing design variable determined for each of the multiple elements.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A-C depict object designs resulting from methods for optimizing design using existing methods of topology optimization.

FIG. 7 depicts mathematical definitions for variables used in embodiments for determining optimized designs for manufacturing.

FIG. 8 depicts mathematical definitions for variables used in embodiments for determining optimized designs for manufacturing.

FIG. 9 illustrates mathematical operations that may be implemented in embodiments.

FIG. 10 depicts mathematical definitions for variables used in existing methods.

FIGS. 12A-C depict geometries of an object determined using a variety of design methods.

DETAILED DESCRIPTION

A description of example embodiments follows.

The teachings of all patents, published applications, and references cited herein are incorporated by reference in their entirety.

The term "sensitivities" is used herein, however, it is noted that sensitivities are mathematically equivalent to derivatives, and the term sensitivities is commonly used in multidisciplinary optimization.

Figure 1:
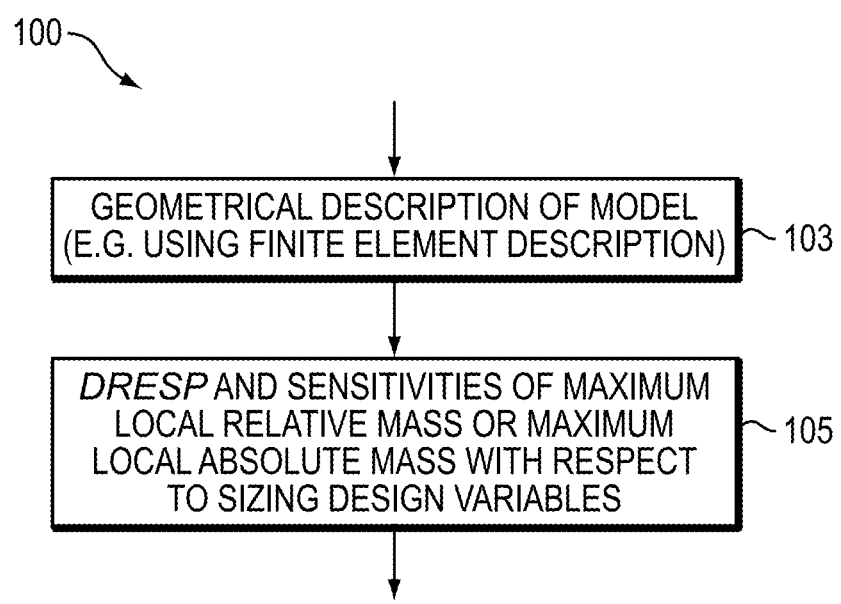
FIG. 1 is a flow chart of a method for determining an optimized design of an object for manufacturing according to an embodiment.

Generally, embodiments use sensitivities based sizing optimization to determine designs for manufacturing real-world objects. Embodiments may implement sensitivities based sizing optimization for local control of design patterns on surfaces for enhanced physical properties. FIG. 1 depicts one such example method 100 that employs sensitivity based sizing optimization to determine an optimized design for manufacturing a real-world object. The method 100 begins at step 103 by defining the geometrical description of a model. The model may be defined at step 103 according to any principles known on the art. Likewise, the model may be any such model known in the art that can be employed in optimization methods. According to one example embodiment of the method 100, the model defined at step 103 is a finite element model. To continue, at step 105, the sizing optimization of the model (defined at step 103) using the Maximum Local Relative mass or Maximum Local Absolute mass as design responses is combined with the corresponding sensitivities, i.e., sensitivities of the Maximum Local Relative mass or sensitivities of the Maximum Local Absolute mass, for optimization. According to an embodiment, Maximum Local Relative mass or volume and Maximum Local Absolute mass or volume are obtained by accumulating the calculated local volume or mass constraints in a single constraint approximating the maximum value in the considered set of constraints. Here mass and volume can be represented by their absolute values or the corresponding relative values, i.e., divided by the maximum possible values. In this way, at step 105, the design response of the Maximum Local Relative mass or the Maximum Local Absolute mass is included in the sizing optimization. In an embodiment, the optimization includes optimizing an objective function which should be minimized or maximized. The objective functions are the key performance indicators (KPIs), i.e., design responses that are desired to be maximized or minimized. Examples include the mass, the static stiffness, static strength, modal eigen frequencies, or steady state responses of the real-world object, amongst other examples, or a combination of these example functions. Thus, in such an embodiment, the Maximum Local Relative Mass or Maximum Local Absolute mass is included in the sizing optimization for an objective function of the sizing optimization. In another embodiment, the optimization at step 105 includes the Maximum Local Relative Mass or Maximum Local Absolute mass in the constraints of an optimization of the sizing design variables. Thus, such an embodiment can be employed to optimize surface milled fuselage structures (e.g. aerospace), 3D printed surface structures (e.g. pipes), and welded plates for enforcing skin structures (e.g. ship designing), amongst other examples.

By including sensitivities of the local mass, i.e., sensitivities of a sizing design variable, embodiments of the present invention can determine optimized designs for real-world objects for manufacturing. Existing methods do not provide such functionality. For instance, existing methods, such as those described in: (1) J. Wu, N. Aage, R. Westermann, O. Sigmund, Infill optimization for additive manufacturing—Approaching bone-like porous structures, IEEE Transactions on Visualization and Computer Graphics 24 (2) (2018) 1127-1140; (2) J. Wu, A. Clausen, O. Sigmund, Minimum compliance topology optimization of shell-infill composites for additive manufacturing, Computer Methods in Applied Mechanics and Engineering 326 (2017) 358-375; (3) A. Clausen, N. Aage, O. Sigmund, Exploiting additive manufacturing infill in topology optimization for improved buckling load, Engineering 2 (2) (2016) 250-257; (4) M. Bendsøe, O. Sigmund, Topology Optimization—Theory, Methods and Applications, Springer Verlag, Berlin Heidelberg N.Y., (2002); (5) G. G. Tejani, V. J. Saysani, V. K. Patel, P. V. Saysani, Size, shape, and topology optimization of planar and space trusses using mutation-based improved metaheuristics, Journal of Computational Design and Engineering 5 (2018) 198-214; (6) https://www.plm-europe.org/admin/presentations/2017/2003_PLMEurope_24.10.17-13-30_GUY-WILLS_SPLMM_topology_optimization_for_designers.pdf; (7) ASME AM3D Training, "Design Demonstration Part 2," https://www.youtube.com/watch?v=921geNgIY5A, published Oct. 27, 2016; and (8) ASME AM3D Training, "Rules of Thumb," https://www.youtube.com/watch?v=Vjda67dNgDo, published Oct. 27, 2016, the contents of which are herein incorporated by reference, do not include sensitivities of sizing design variables in optimization methods to determine optimized designs for real-world objects. Further, these existing methods do not provide sensitivity based solutions that determine physical properties of a real-world object through a sizing optimization that implements local control of design patterns on surfaces using Local Relative mass or Local Absolute mass design responses.

The design variables types for structural optimization are typically classified into three categories: topology, size, and shape. Topology optimization design variables are for designing the structural material layout and for finding the optimized spatial order and connectivity of the members in the object. Size optimization design variables are for designing the geometrical properties of the structure, such as the thicknesses of sheets and cross-sectional dimensions of trusses and frames, amongst other examples. Shape optimization design variables relate to modifying the structurally predetermined boundaries of an object. For example, shape optimization may be used for a CAE continuum model where the locations of the surface nodes are defined as design variables or for a CAE beam and truss model where the locations of the elemental end-nodes are defined as design variables.

FIGS. 2A-2C depict models 220a-c, respectively, designed using topology optimization methods. The models 220a-c were designed using topology optimization solutions that implement local volume design response (DRESP) constraints. These existing optimization methods only apply local volume design responses to design variables for topology optimization and do not apply volume design responses to sizing design variables.

Figure 3B:
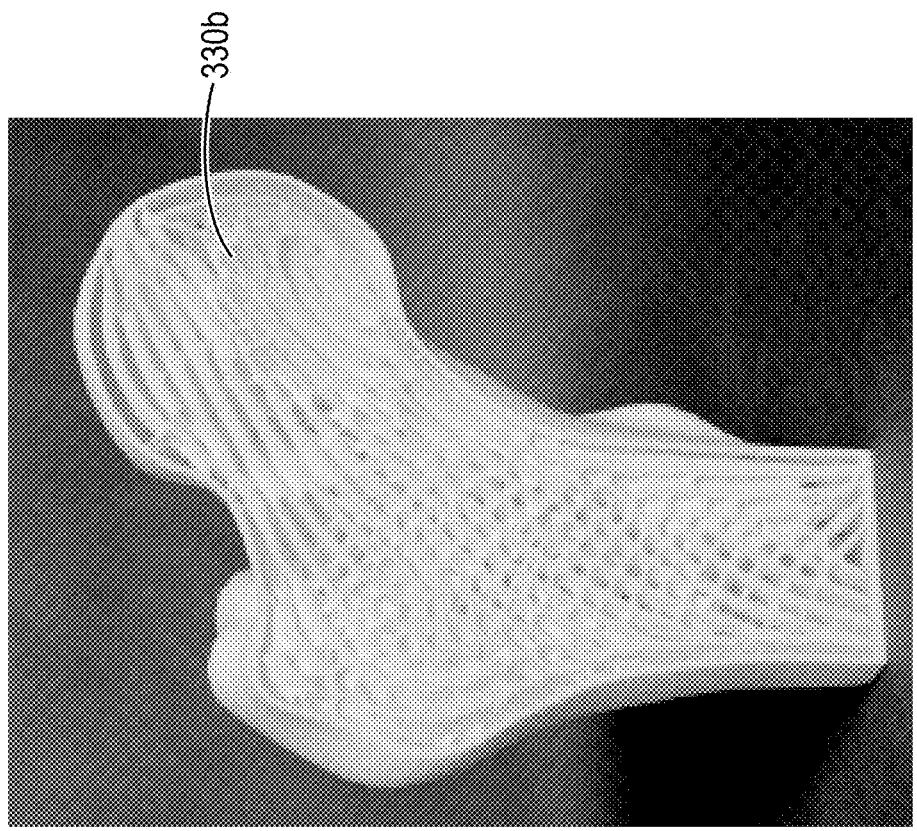
FIG. 3A and FIG. 3B depict designs of real-world objects determined using existing optimization methods.
Figure 3A:
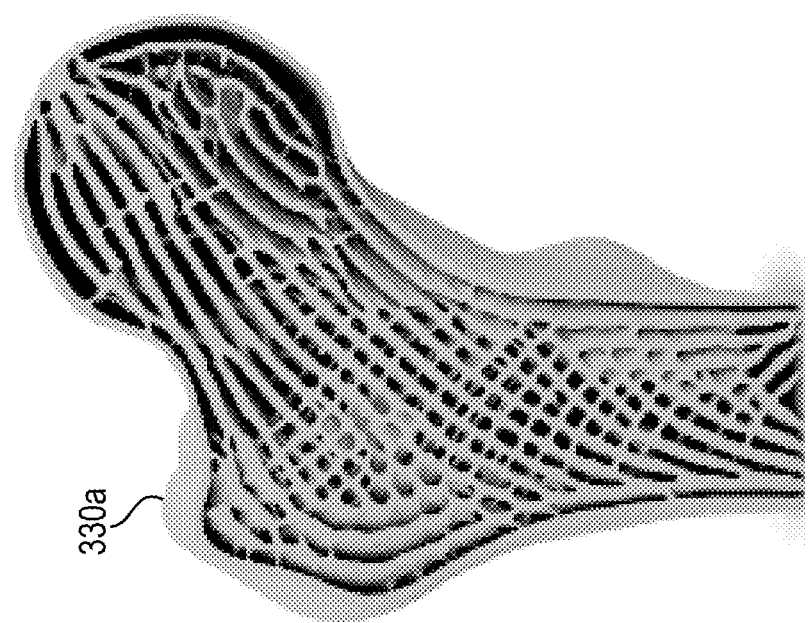

Typically, using local volume or local mass design responses in topology optimization for 2D yields a lattice like design which has poor mechanical properties for stiffness compared to a membrane structure. However, from an industrial point of view, 2D structural solutions are not of interest. Using a local volume design response in topology optimization for 3D objects typically yields multiple layered membrane structures. FIGS. 3A and 3B illustrate two such example object designs, 330a and 330b, respectively, that result from using local volume or local mass design responses in topology optimizations. The objects 330a and 330b have the bone-like porous structures which are very difficult to manufacture. Such structures are infeasible to manufacture using traditional manufacturing processes such as casting, molding, forming, machining (e.g., milling), and joining. Likewise, the designs 330a and 330b typically cannot be manufactured using additive manufacturing approaches. Additive manufacturing methods would fail to manufacture these multiple layered membrane structures because the unused powder used for printing the objects cannot be removed after manufacturing is completed. Further, typically post-manufacturing processes, such as drilling round holes, polishing surfaces, and removing support structures cannot be performed on objects with these multiple layered membrane designs. Embodiments of the present invention for sizing optimization do not have these manufacturing drawbacks and issues when using local volume or local mass design responses.

Topology optimized designs determined using local volume constraints are more robust with respect to material deficiency. For instance, the designs are more robust even if a subcomponent fails due to misuse, collision, explosion, corrosion, fatigue failure, manufacturing error, etc. Secondly, topology optimized designs determined using local volume constraints are more robust with respect to force variations and boundary condition variations. Thirdly, numerical experiments show that topology optimized designs determined using local volume constraints yield higher buckling loads. Likewise, embodiments of the present invention that implement sizing optimization using local volume or local mass design responses have the same robustness benefits as designs determined using topology optimization, i.e., robustness with respect to material deficiency, robustness with respect to force and boundary condition variations, and robustness in response to higher buckling loads.

Figure 4A:
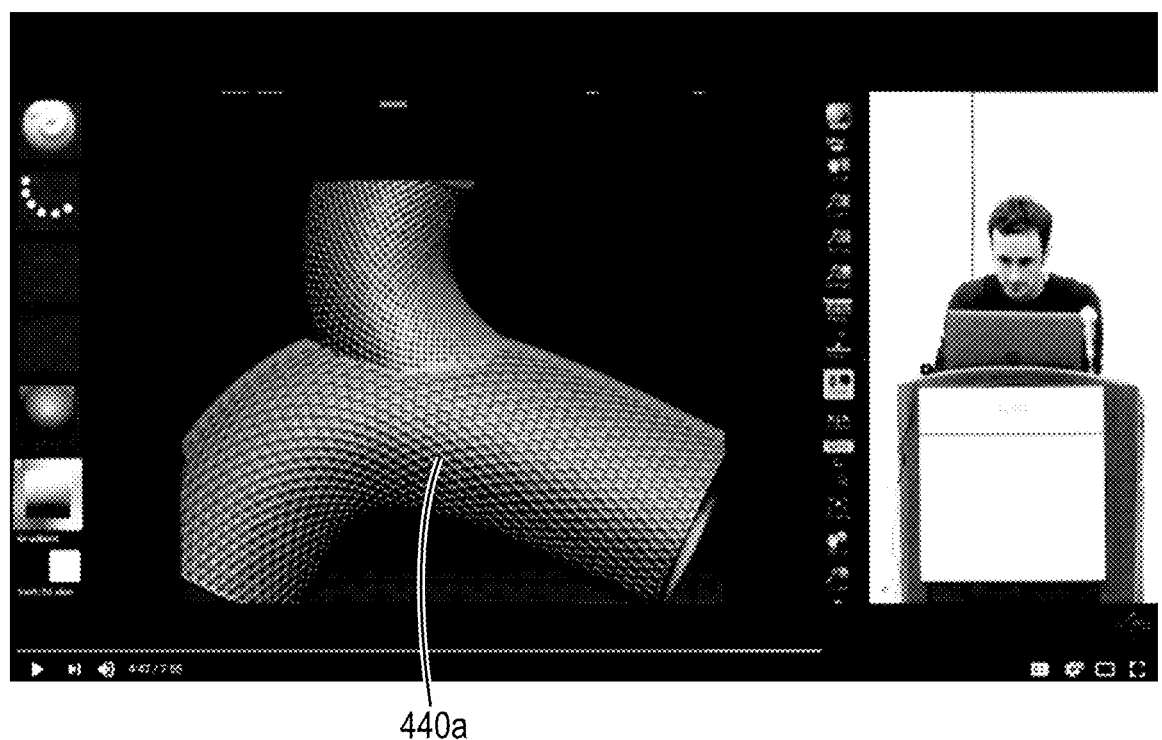
FIG. 4A and FIG. 4B depict objects designed using existing methods that determine designs based on strictly geometrical design considerations.
Figure 4B:
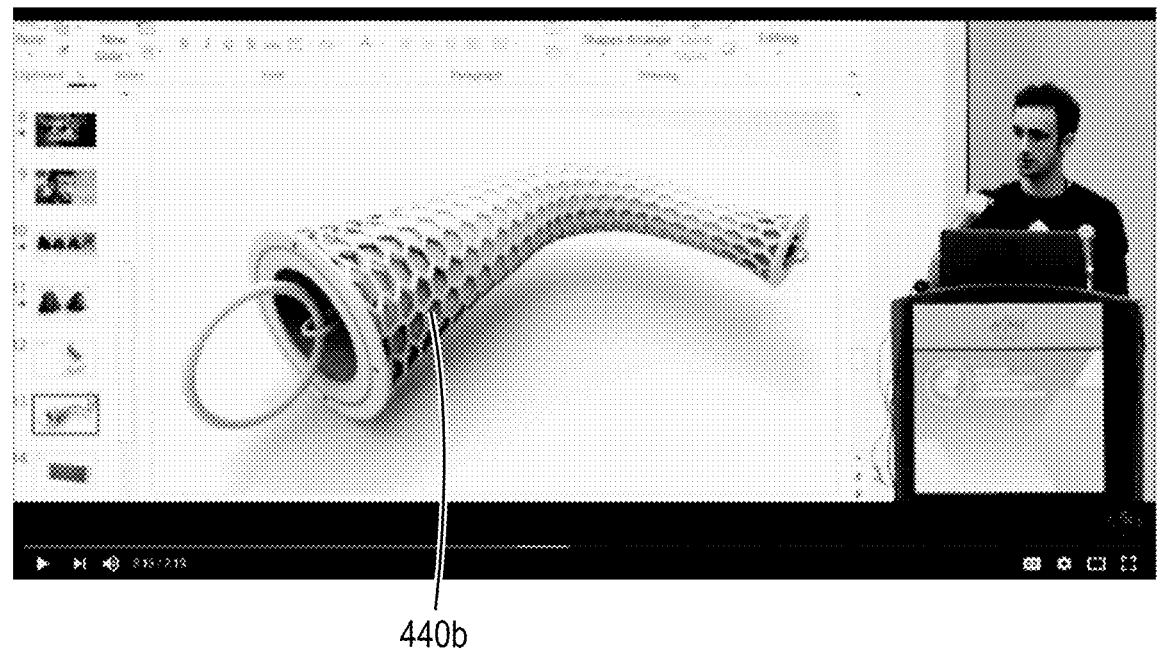

Another existing method of computer based design of objects relies on geometrical design considerations and heuristic design rules. The methods described in ASME AM3D Training, "Design Demonstration Part 2," https://www.youtube.com/watch?v=921geNgIY5A, published Oct. 27, 2016 and ASME AM3D Training, "Rules of Thumb," https://www.youtube.com/watch?v=Vjda67dNgDo, published Oct. 27, 2016 rely on strictly geometrical design considerations and heuristic design rules for designing and generating patterns on sheet structures. FIGS. 4A and 4B depict the sheet structures 440a and 440b, respectively, that result from these methods. These geometrical design consideration methods are experiential and empirical approaches where the mechanical properties are not directly considered by CAE modeling and sensitivity based optimizations. Moreover, these geometrical design consideration methods rely on the existence of a smooth UV mapping over the target surface to guide the geometric patterns. Thus, these existing methods are unreliable on more complex surfaces.

Relying on geometrical considerations is fundamentally different from embodiments of the present invention. To illustrate, in contrast, embodiments utilize sensitivity based sizing optimization approaches where the designing is simultaneously directly driven by the mechanical modeling (CAE) and by the sensitivity optimization of the mechanical properties defined in the design responses, i.e., optimization setup. In an embodiment, the "optimization setup" defines the design responses that are desired to be maximized or minimized, defines the design responses that are constrained, and defines bounds on the design variables. In embodiments, the mechanical properties defined in the optimization setup includes the design responses (DRESP) for the geometrical considerations for generating a pattern on the structures, e.g., sheet structures, shell structures, or membrane structures.

Figure 5B:
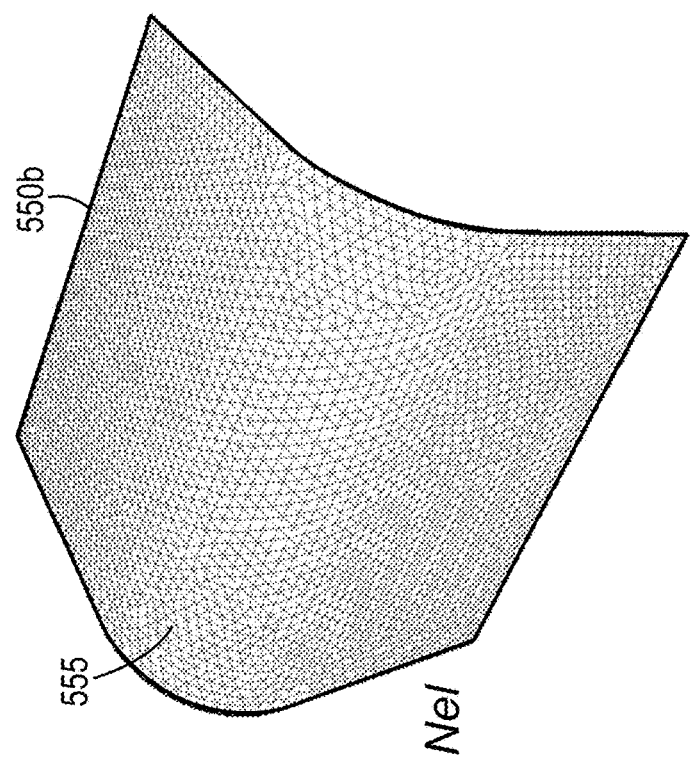
FIG. 5B depicts a portion of a finite element model that is considered in an embodiment of the invention.
Figure 5A:
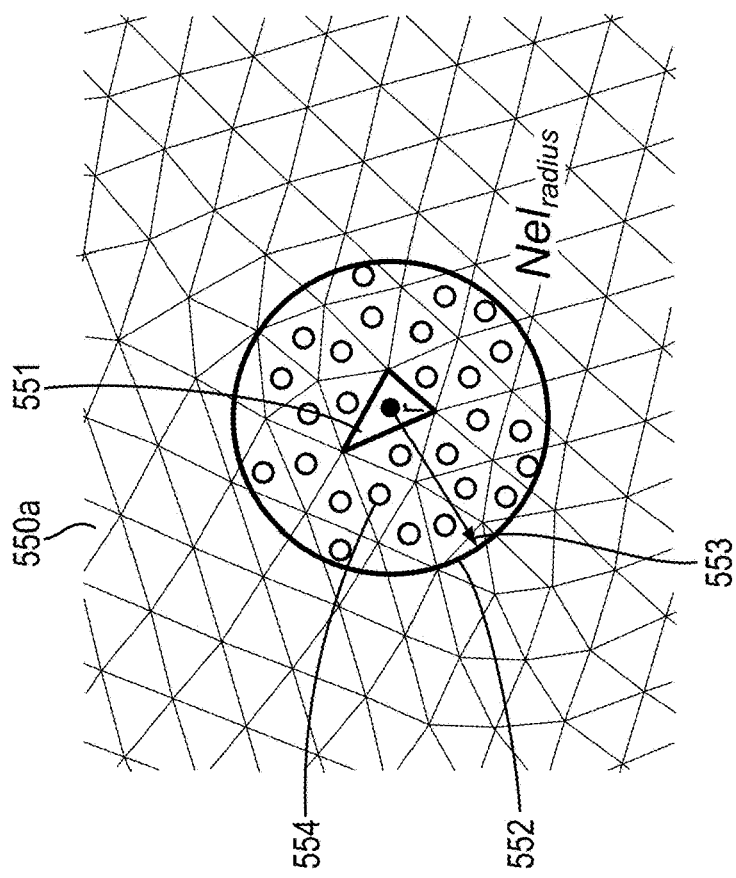
FIG. 5A depicts elements of a finite element model that may be used in embodiments to determine optimized sizing design variable characteristics for manufacturing.

As described herein, embodiments employ local volume constraints (which may include a volume constraint, a material density constraint, and a material mass constraint). Existing methods have defined a similar Maximum Local Relative mass or Maximum Local Absolute mass to be used in optimizations. However, existing methods do not utilize the Maximum Local Relative mass or Maximum Local Absolute mass in sizing optimizations. FIG. 5A illustrates a portion 550a of a typical structural CAE model for which the Local Relative mass or Local Absolute mass is calculated for the element 551 in the center of the circle 552 with the radius r 553 using the elements ($Nel_{radius}$) that have their elemental centroid, e.g., the centroid 554, contained inside the radius r 553. Based upon the definition of the Local Relative mass or Local Absolute mass for the element 551, the Maximum Local Relative mass or Maximum Local Absolute mass can be calculated for each of the finite elements (Nel) 555 of the entire component 550b or a sudden partition of the component 550b depicted in FIG. 5B. In such an embodiment, the Local Relative masses or Local Absolute masses are determined for each element and then, by sampling over all of the Local Relative masses or Local Absolute masses for Nel 555, the maximum value is determined. Local Absolute mass refers to an absolute number, e.g. in grams or kilograms or pounds. An example local absolute mass is a maximum of 0.1 kg in a radius of 10 cm. Oppositely, Local Relative mass has no units. Thus, the Local Relative mass is mapped to an initial design (before design modifications). For instance, a Local Relative mass is 100% if the initial design has 0.1 kg in a 10 cm radius and it is desired to maintain that value.

Embodiments leverage local constraints, i.e., local volume constraints (which may include a volume constraint, a material density constraint, and a material mass constraint) in sizing optimizations to determine an optimized design of a real-world object for manufacturing. Embodiments utilizing the local volume constraints can provide local control of design patterns on a surface of an object. In embodiments, local control of design patterns, i.e., sizing, in sheet structures that model an object is achieved using local volume or local mass design responses as complementary constraints or objectives for standard sheet sizing optimization definitions that address typical mechanical properties for the optimization with respect to mass, stiffness, strength and dynamic properties. In other words, in embodiments, local volume constraints/objectives are incorporated into the optimizations for traditional properties, e.g., stiffness. In this way, designs are determined that are optimized for typical properties, i.e., mass, stiffness, and strength, as well as sizing properties, e.g., thickness of a sheet, using the local constraints. According to an embodiment, the traditional properties are KPIs, i.e., design responses, to be optimized.

Uniquely, embodiments introduce the local volume or local mass design responses which can locally control or enforce the design of the object, including, patterns on the surface of the object, in a sizing design method. Further, embodiments do not just introduce the local volume or local mass design responses for geometrical considerations but, consider the local volume or local mass design responses in the optimization along with the mechanical properties with respect to static stiffness, static strength, modal eigen frequencies, steady state responses, etc.

Solutions do not exist for mechanical optimization in the form of sizing optimization of sheet structures (also often referenced to as shell or membrane structures in CAE) which, in a highly efficient numerical optimization manner, can enforce geometrical local control of design patterns on the sizing designed surfaces and also address the optimization for mass, stiffness, strength, and dynamic properties, amongst other considerations. Embodiments provide such solutions.

For optimization methods that are based upon sensitivities as input for mathematical programming, i.e., the optimization computations, it is vital that design responses for the optimization can also be defined to control geometrical layout of the design variables. For instance, when considering robustness and manufacturability, the design responses for the optimization are defined so that design responses control geometrical layout and traditional properties (design responses), e.g., stiffness. In embodiments, this is done by combining general sizing optimization with Maximum Local Relative mass or Maximum Local Absolute mass.

It is noted that while embodiments are described as addressing sizing solutions for structural optimizations, embodiments are not limited to structural optimization disciplines but, can also be implemented in multi-physics optimizations such as, computational-fluid-dynamics, thermo-mechanical, electro-mechanical, and fluid-structure-interaction optimizations, amongst other examples.

Figure 6:
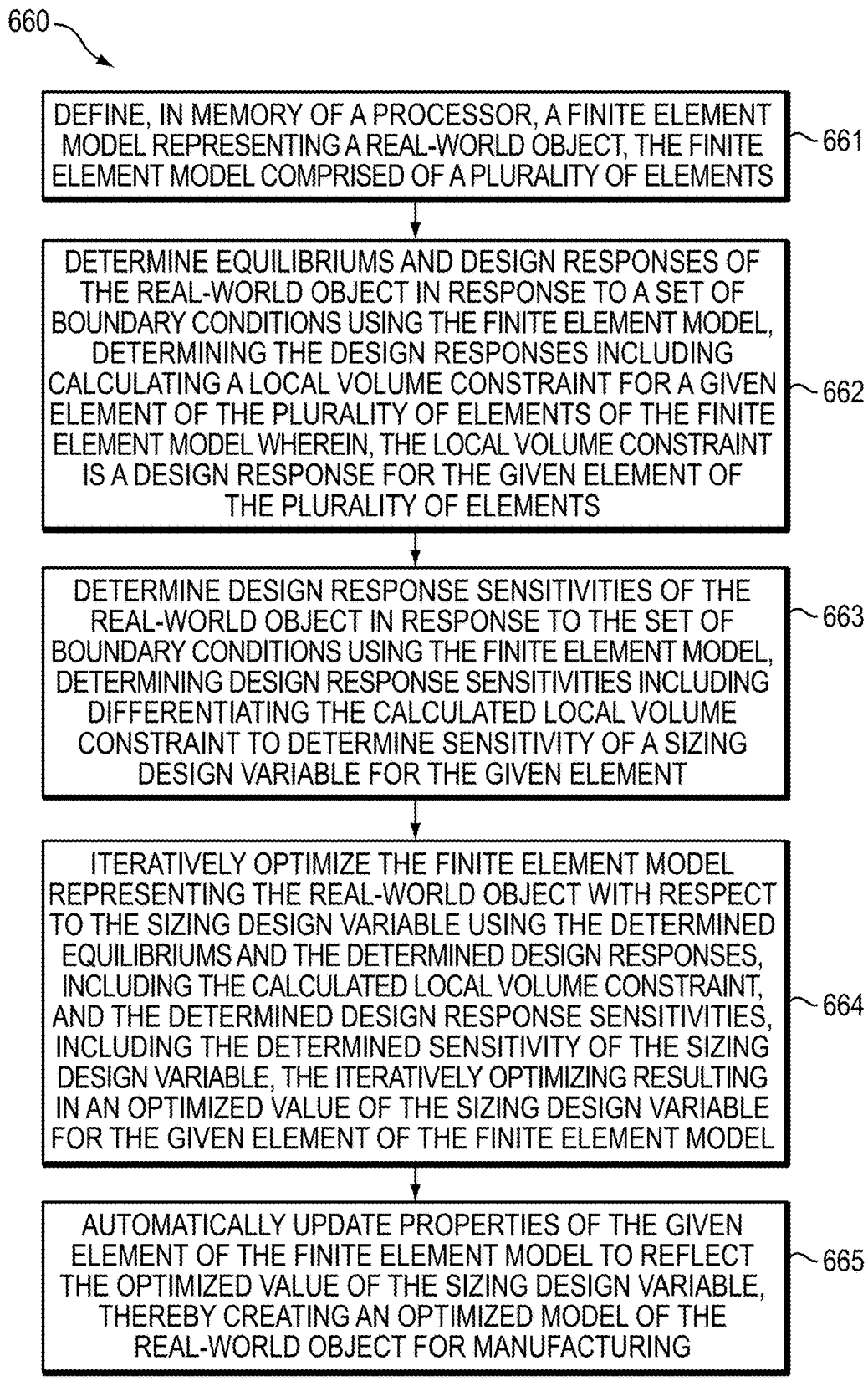
FIG. 6 is a flow chart of a method for automatically determining an optimized design for manufacturing a real-world object according to an embodiment.

FIG. 6 illustrates a method 660 according to an embodiment that implements a sizing optimization to automatically determine an optimized design for manufacturing a real-world object through use of local volume constraints. The method 660 begins at step 661 by defining, in memory of a processor, a finite element model representing a real-world object where, the finite element model is comprised of a plurality of elements. According to an embodiment, an "element" is a tessellated element of the finite element model. However, embodiments are not limited and may be employed in relation to any elements, such as triangular or quadrilateral membranes or shells. According to an embodiment of the method 660, the finite element model may be defined at step 661 according to any method known in the art. Further, in embodiments, the finite element model defined at step 661 may be any such finite element as is known in the art. For instance, in an example embodiment, the finite element model defined at step 661 is a sheet model of a surface of the real-world object. According to an embodiment, defining the model at step 661 includes defining a finite element model in memory that reflects all of the properties, e.g., the dimensions, materials, etc., of the object the model represents and the model includes several design variables, e.g., plate thicknesses. Further, the behavior of the finite element model is governed by an equation, known in the art, and this equation includes a respective sensitivity equation for the design variables, e.g., plate thicknesses. In such an embodiment, defining the model may include defining the equation that governs behavior of the model, i.e., the object that the model represents.

At step 661, according to a computer implemented embodiment of the method 660, the memory is any memory communicatively coupled, or capable of being communicatively coupled, to the computing device performing the method 660. Likewise, the processor is any processor known in the art and may also include any number of processors in a distributed computing arrangement.

The method 660 continues at step 662 by determining equilibriums and design responses, i.e., design response values, of the real-world object in response to a set of boundary conditions using the finite element model. According to an embodiment, equilibriums define various configurations for external forces where the system, i.e., object, is in balance. For each of these given balances, several design responses can be defined like stiffness, strength, modal eigenfrequencies, etc. Other design responses are independent upon the equilibriums, such as mass. Determining the design responses at step 662 includes calculating a local volume constraint for a given element of the plurality of elements of the finite element model wherein, the local volume constraint is a design response for the given element of the plurality of elements. In an embodiment, the boundary conditions may be any such boundary conditions known in the art, such as loads, external constraints, stiffness interfacing to other components, etc.

According to an embodiment, the local volume constraint calculated at step 662 includes: a volume constraint, a material density constraint, and a material mass constraint. In this way, embodiments may account for the volume of material as well as the material type. Further, in embodiments, different portions of the finite element model may be subject to different constraints. Further still, in an embodiment of the method 660, the local volume constraint applies to the given element and other elements of the finite element model within a radius surrounding the given element. In one such embodiment, the other elements are within the radius when elemental centroids of the other elements are within the radius. Moreover, in an embodiment, the volume constraint may be defined as described hereinabove in relation to FIGS. 5A and 5B.

Next, at step 663, design response sensitivities of the real-world object in response to the set of boundary conditions are determined using the finite element model. Determining design response sensitivities at step 663 includes differentiating the calculated local volume constraint to determine sensitivity of a sizing design variable for the given element. In the method 660, the sizing design variable may represent any such sizing variable of the real-world object that is known in the art. For instance, in an example embodiment of the method 660, the sizing design variable represents at least one of: thickness, lattice structure, and cross-sectional dimensions of the real-world object. According to an embodiment, step 663 further includes implementing and computing all values and corresponding sensitivities of other design responses, such as stiffnesses, stresses, and displacements, amongst others, that are needed or desired for the optimization.

To continue the method 660, the finite element model representing the real-world object is iteratively optimized at step 664. At step 664, the finite element model is optimized with respect to the sizing design variable using the determined equilibriums and the determined design responses (which include the calculated local volume constraint) and the determined design response sensitivities (which include the determined sensitivity of the sizing design variable). The iterative optimizing at step 664 results in an optimized value of the sizing design variable for the given element of the finite element model. According to an embodiment, the iterative optimizing, i.e., iterative design process, of step 664 is a process of the selection of a new improved solution (with regard to an objective and constraints defined through design responses) per optimization iteration.

After the iterative optimizing at step 664, properties of the given element of the finite element model are automatically updated to reflect the optimized value of the sizing design variable at step 665. In this way, the method 665 creates an optimized model of the real-world object for manufacturing. When the optimized design variables, i.e., optimized values of the design variables, have been determined then the optimized finite element model can be converted into a format and submitted to real manufacturing processes where the local control of design patterns on surfaces is important for fulfilling manufacturing constraints and the obtained design is directly manufactured. In embodiments, through controlling the local volume constraints, constraints for the design can be set that comply with real-world limitations of manufacturing processes and thus, embodiments determine optimized designs for manufacturing real-world objects.

An embodiment of the method 660 determines optimized values for the sizing design variable for multiple elements of the finite element model. In this way, such an embodiment can determine an optimized design for manufacturing the entire real-world object. Such an example embodiment further includes, at step 662, calculating a local volume constraint for each of multiple elements of the finite element model where, each local volume constraint is a design response for a respective element of the plurality of elements and, at step 663, differentiating each calculated local volume constraint to determine sensitivity of the sizing design variable for each of the multiple elements. To continue, at step 664, such an embodiment iteratively optimizes the finite element model using the determined equilibriums and the determined design responses (which include the calculated local volume constraint for each of the multiple elements) and the determined design response sensitivities (which include the determined sensitivity of the sizing design variable for each of the multiple elements). In turn, at step 665, properties of each of the multiple elements are automatically updated to reflect the value of the sizing design variable determined for each of the multiple elements. Through this additional functionality, such an embodiment determines an optimized value of the sizing design variable for each of the multiple elements and creates an optimized model of the real-world object for manufacturing.

Another embodiment of the method 660 continues by causing the real-world object to be manufactured according to the optimized model. In one such embodiment, after the model is updated at step 665, the updated model is digitally communicated to a manufacturing machine capable of producing the real-world object according to the optimized model. In an embodiment, the digital model is communicated using any communication method known in the art and may be communicated to any manufacturing machine known in the art, such as an additive manufacturing machine or a computer numerical control (CNC) machine.

Embodiments are based upon including the design response (DRESP) and corresponding sensitivities for volume constraints in optimization setups based upon sizing design variables. An embodiment utilizes the design response and corresponding sensitivities for the Maximum Local Relative mass or Maximum Local Absolute mass constraints. Further, it is noted that while the term volume or mass is used herein, the constraint may include any combination of mass, volume, and density. In such an embodiment, the Local Relative mass and Local Absolute mass are defined for a CAE model as described hereinabove in relation to FIG. 5A, e.g., a finite element model, according to the definitions 770 depicted in FIG. 7.

When the Local Relative mass and Local Absolute mass are defined according to the definitions 770, depicted in FIG. 7, then, the P-mean norm, see FIG. 8, is applied to approximate the corresponding maximum value of the constraint, e.g., mass, over the finite elements defining the design response (DRESP) for the optimization. FIG. 8 depicts definitions 880 that define the Maximum Local Relative mass and Maximum Local Absolute mass being approximated with a P-mean norm approach. In embodiments, the P-mean norm may be applied to approximate the maximum value of the constraint over finite elements defining the entire component, i.e., the entire object, or a partition of the object, as depicted in FIG. 5B and described hereinabove.

Further, while the definitions 880 in FIG. 8 apply the P-mean norm for approximating the Maximum Local Relative mass and Maximum Local Absolute mass, embodiments are not so limited. Alternatively, embodiments may employ other functions for approximating the maximum such as: p-norm, smooth maximum, and other similar approaches, while, at the same time requiring the maximum to be differentiable (i.e. the derivative of the maximum can be expressed mathematically for a given design response).

Embodiments utilize the Maximum Local Relative mass and Maximum Local Absolute defined according to the definitions 880, to determine sensitivities, i.e., derivatives of sizing design variables, that are used for sensitivity optimization. According to an embodiment, the sensitivities are determined using the mathematical operations 990 depicted in FIG. 9. The mathematical operations 990 differentiate the approximated Maximum Local Relative mass and Maximum Local Absolute mass for design variables related to topology optimization and for design variables related to sizing optimization. If one is changing the type of sizing design variable, then only the mathematical partial derivatives, 991*a-b* and 992*a-b* have to be defined. As shown in the mathematical operations 990, the topology optimization design variables 991*a* and 991*b* are directly coupled to the elemental density, whereas the sizing design variables 992*a* and 992*b* are directly coupled to the elemental volume.

In contrast to embodiments of the present invention, traditional methods for including a mass characteristic design response in topology optimization and sizing optimization apply a Global Relative mass or Global Absolute mass as shown by the mathematical definitions 1010 depicted in FIG. 10. In this traditional method for global summation, Nel is applied rather than $Nel_{radius}$ as no radius r is applied in the traditional definitions 1010 depicted in FIG. 10.

Embodiments of the present invention provide numerous advantages compared to existing methods and greatly enhance industry design methods. In recent years, design processes have transformed from being typical trial and error design processes to modern design processes which include the introduction of simulations early in the design processes, and more importantly, the introduction of automated sensitivity based optimization. Industry applications, such as automotive and aerospace applications, use sensitivity based sizing optimization for structural parts. These sensitivities based optimizations are often based upon on few load cases combined with a Global Relative mass or a Global Absolute mass. Commonly, using a Global Relative mass or using a Global Absolute mass yields highly optimized designs. However, these highly optimized designs have low robustness for (i) variations in loading conditions, (ii) variations in boundary conditions, and (iii) variations in material locations due to manufacturing and structural stability. Applying, the Maximum Local Relative mass or Maximum Local Absolute mass as in embodiments, increases the robustness of the designs when using sensitivity based sizing optimization. Sizing optimized designs determined using a Maximum Local Relative mass or using a Maximum Local Absolute mass often have increased geometrical details in the form of rib patterns but, the sizing approach ensures that the designs can easily be manufactured using traditional milling or additive manufacturing processes.

Other advantages of using local volume design response in sizing optimization is the ability to implement the sizing optimization using other design requirements, e.g. stiffness and strength. Another advantage is the ability to set constraints to yield parts with a structure, e.g., rib structure, that can be easily manufactured using classic manufacturing methods such as, milling, molding, or newer manufacturing methods such as deep drawing or printing in additive manufacturing, e.g., powder bed technology. Yet another advantage is determining robust sizing designs, e.g., designs that are robust to variations in assembly processes or manufacturing processes. Further still, another advantage is achieving structurally stable design (e.g. against buckling) of thin panels and sheets in an efficient manner where the designs are also optimized for other properties such as mass, stiffness, strength, and dynamic properties.

Figure 11:
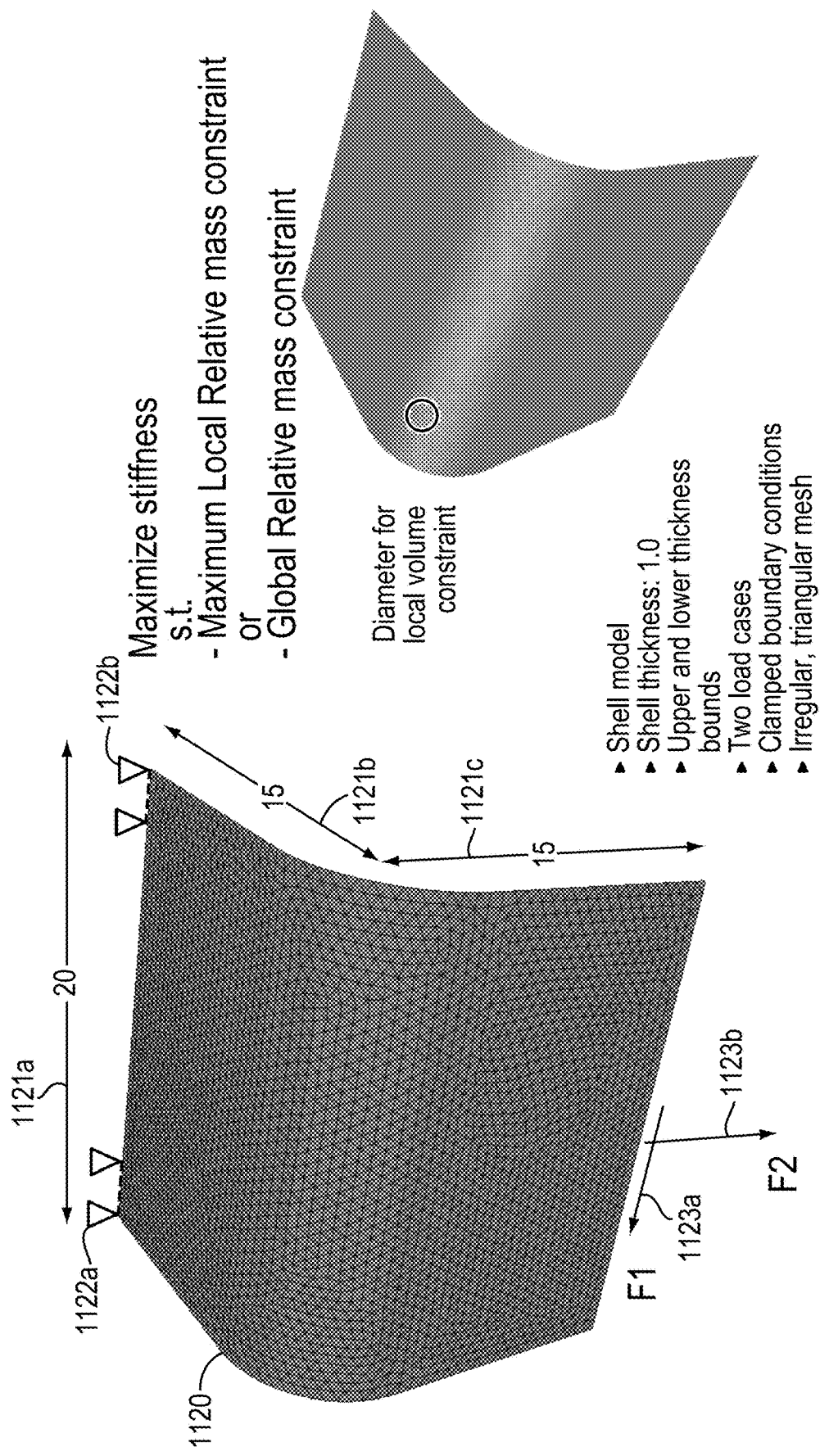
FIG. 11 illustrates a model and dimensions used in an embodiment for sizing optimization.

Hereinbelow, in relation to FIGS. 11-14, practical examples are described to illustrate advantages of embodiments. FIG. 11 shows the dimensions 1121a-c for a practical example for sizing optimization for designing a structural component 1120 using a numerical implementation having a Maximum Local Relative mass constraint (which is defined according to the definition 880 in FIG. 8). The component 1120 is subject to the boundary conditions 1122a and 1122b and is subject to the loads 1123a and 1123b. In FIG. 11, the design variables for the sizing optimization are the elemental shell thicknesses and each shell element modeling the structure 1120 is defined as a design variable. The objective of the optimization is to minimize the total compliance of the two load cases and thereby, maximize the structural stiffness for the two load cases. The sizing optimization having a Maximum Local Relative mass is constrained to be 100% of the initial designs. The optimization uses the mathematical definitions/operations 770 and 880 depicted in FIGS. 7 and 8, respectively, where the radius (as described hereinabove in relation to FIG. 5A) is set to 2.5 and the overall dimensions 1121a-c of the structure 1120 are defined as depicted in FIG. 11.

The result of the sizing optimization, according to the principles of an embodiment of the invention for the structure 1120 depicted in FIG. 11 having a local volume constraint is the structure 1220b depicted in FIG. 12B. To achieve these results, an optimization is executed using the workflow 1550 depicted in FIG. 15 and described hereinbelow in further detail. The optimization workflow is stopped when the convergence criteria for the change in objective is less than 0.1% and the change in design elements is also less than 0.1%.

FIG. 12A depicts the initial model 1220a which consists of 5136 shell elements (Abaqus S3 shell elements) with an initial thickness of 1.0. The Young modulus is 210000.0, the Poisson's ratio is 0.3, and linear finite element modelling is applied. The model 1220a is subject to the boundary conditions and loading depicted in FIG. 11, i.e., the boundary conditions 1122a-b and the loading 1123a-b. The boundary conditions 1122a-b are fully clamped constraining all three degrees of freedom for translations as well as for rotations.

The load consists of two load cases having the load $F_1$ 1123a for load case one and the load $F_2$ 1123b for load case two as shown in FIG. 11.

FIG. 12B shows the design 1220b obtained using a Maximum Local Relative mass under the aforementioned conditions. FIG. 12C depicts a resulting structure design 1220c determined using an optimization executed using a classic Global Relative mass constraint as defined in FIG. 10. In the optimization used to obtain the resulting structure 1220c, the Global Relative mass was set so the mass of this optimized structure 1220c is similar to the mass of the optimized structure 1220b determined using the Maximum Local Relative mass.

It can be observed that the design 1220b obtained using Maximum Local Relative mass has increased geometrical details in the form of rib patterns compared to the design 1220c obtained using Global Relative mass but, the sizing approach ensures that the design 1220c can easily be manufactured using traditional milling or additive manufacturing processes.

Figures 13A, 13B:
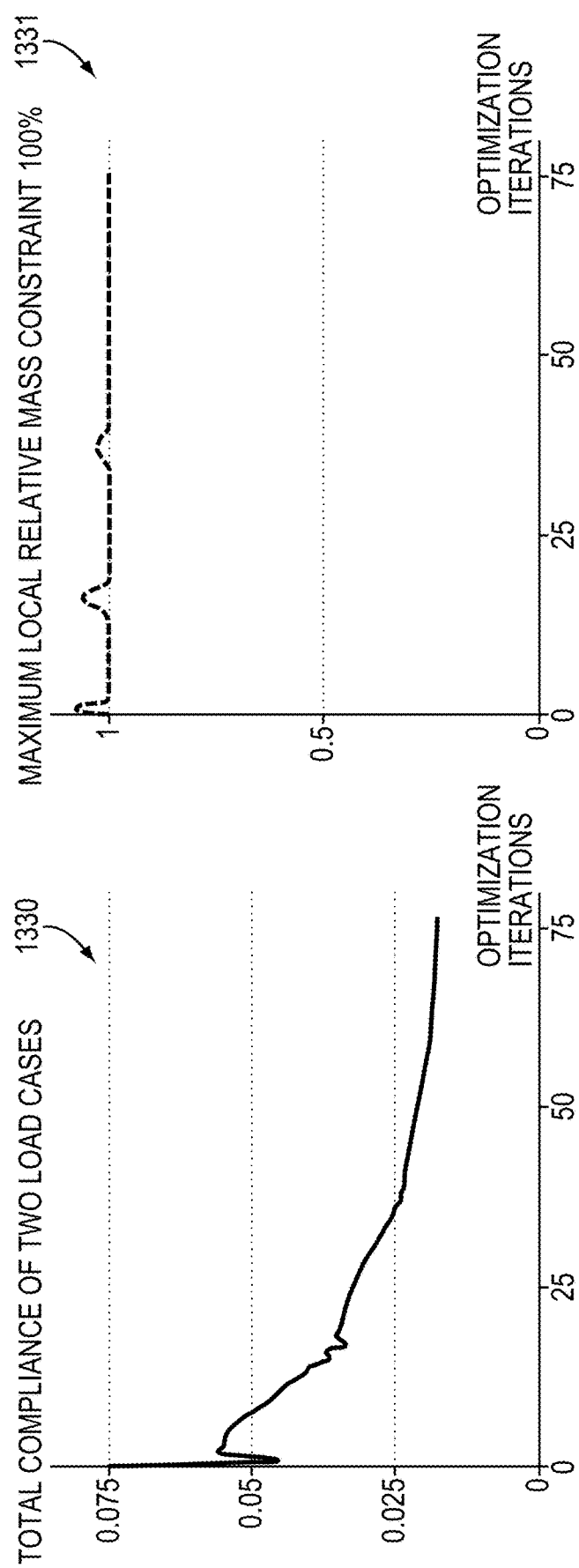
FIGS. 13A-B are graphs illustrating optimization iteration convergence history for methods of determining optimized designs according to the principles of the present invention.

FIGS. 13A and 13B are plots 1330 and 1331, respectively, that show optimization iteration convergence history for the optimization process yielding the structure 1220b. The plots 1330 and 1331 show the value of the compliance of two load cases (i.e. the objective function) representing the flexibility for the load cases, and the local relative mass (i.e. the constraint), with respect to each consecutive optimization iteration cycle.

Figure 14:
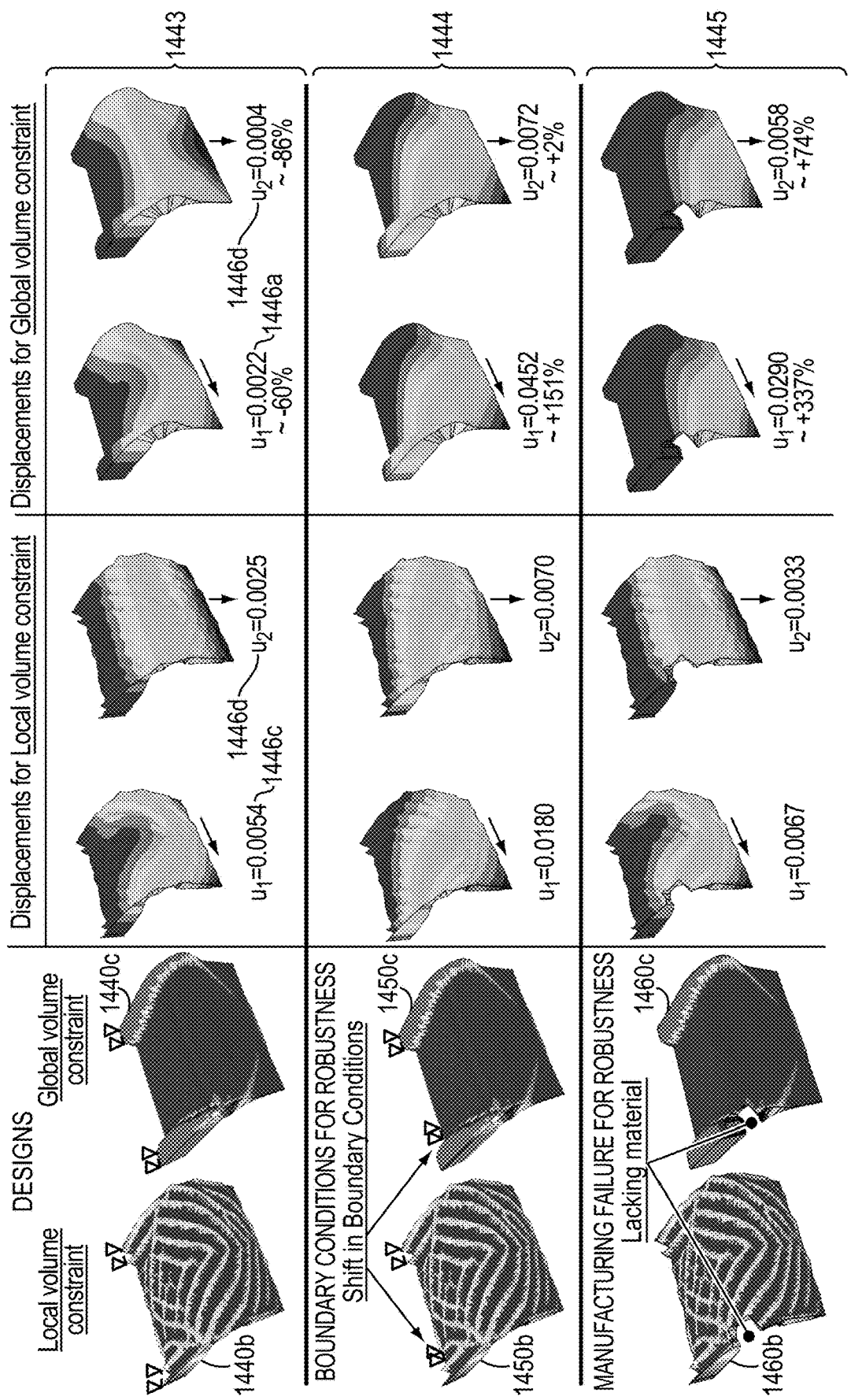
FIG. 14 illustrates object designs determined using various methods for designing real-world objects, including embodiments of the invention.

FIG. 14 compares the displacements of the two load cases for the designs 1440b, 1450b, and 1460b, which have a Maximum Local Relative mass constraint and for the designs 1440c, 1450c, and 1460c which have a classic Global Relative mass constraint. Note that legend limits of the displacements are different. The comparison is done for the ideal designs 1440b and 1440c, for the robustness of the boundary conditions (e.g. for variations in assembly processes) 1450b and 1450c, and for the robustness of manufacturing failure (e.g. for material variations in the manufacturing process) 1460b and 1460c.

The sizing optimization results shown in FIG. 14 are based upon two load cases as shown in FIG. 11. From an industrial point of view, typically between one to twenty load cases are applied. When few load cases are applied in an optimization with a Global Relative mass or a Global Absolute mass this often yields highly optimized designs compared to designs obtained using a Maximum Local Relative mass or using a Maximum Local Absolute mass. This is shown in the first row 1443 in FIG. 14. As depicted in the row 1443, the deflection 1446a at the loading point is $u_1=0.0022$ for load case one and the deflection 1446b is $u_2=0.0004$ for load case two when optimized using the Global Relative mass. Therefore, the stiffness of the design 1440c is 60% and 86% higher than the design 1440b obtained using Maximum Local Relative mass which has a deflection 1446c of $u_1=0.0054$ and a deflection 1446d of $u_2=0.0025$. Recall, that both designs have the same mass. However, the highly optimized design 1440c obtained using Global Relative mass is not robust for external variations which is shown in rows 1444 and 1445.

The row 1444 of FIG. 14 shows the structural responses in the displacements for a shift in the boundary conditions for the designs 1450b and 1450c. From an industrial point of view, this could be caused by misalignments in an assembly process or by external misuse of a component, amongst other examples. It is observed that now the stiffness for the design 1450c is decreased for load case 1 by 151% and for load case by 2% compared to the design 1450b. Again, both designs have the same mass. Thus, the design 1450b determined using Maximum Local Relative mass is more robust for variations in the assembly process or external misuse of the component compared to the design 1450c determined using a Global Relative mass.

The row 1445 of FIG. 14 shows the structural responses in the displacements for the designs 1460b and 1460c lacking material. From an industrial point of view, missing materials could be caused by incorrect depositing or melting of the material in an additive manufacturing process or incorrect cutting in the milling process. It is observed that now the stiffness for the design 1460c is decreased for load case 1 by 337% and for load case 2 by 74% compared to the design 1460b. Again, both designs have the same mass. Thus, the design 1460b determined using Maximum Local Relative mass is more robust for variations in the manufacturing process compared to the design 1460c determined using a Global Relative mass.

Figure 15:
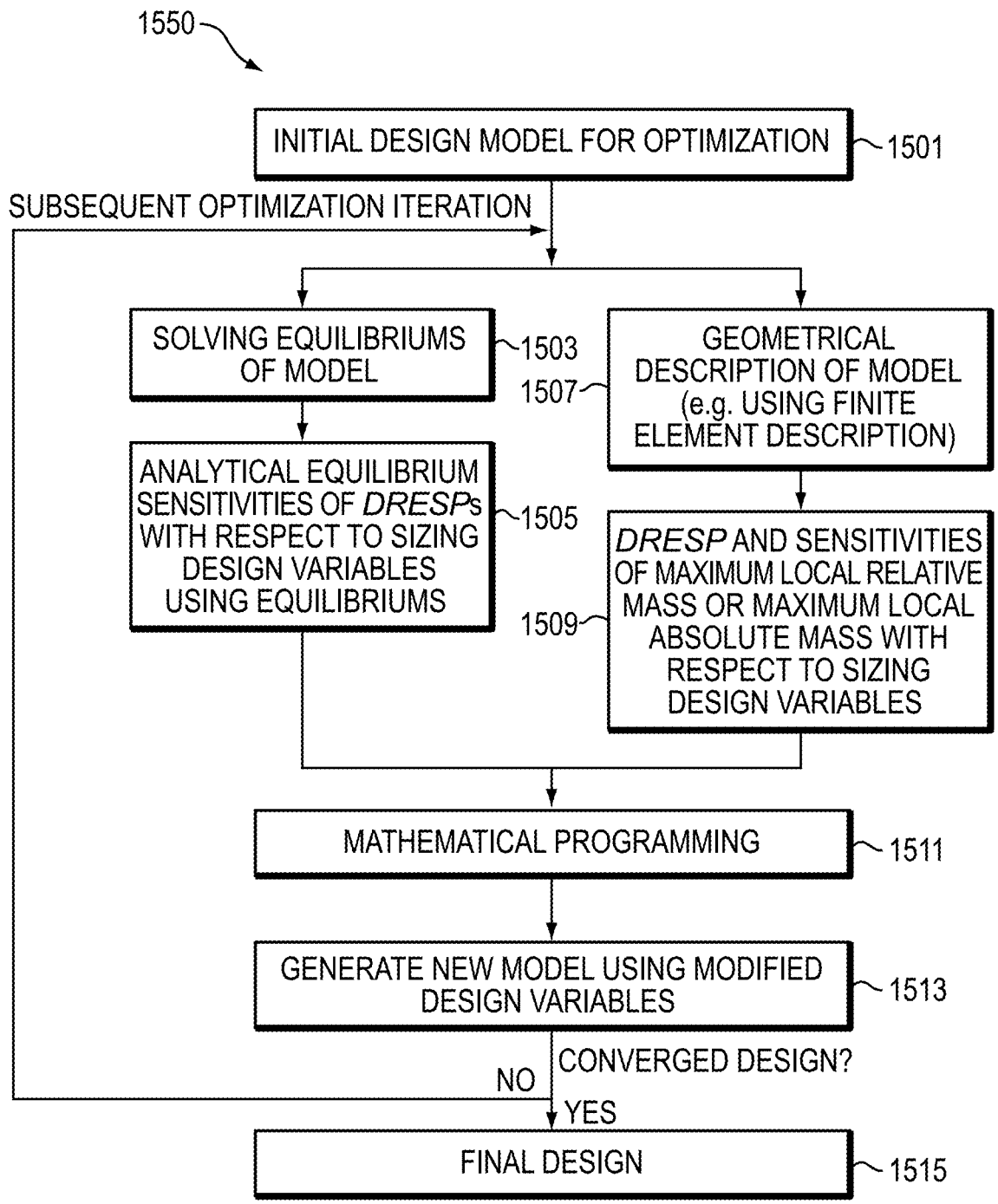
FIG. 15 is a flow diagram of an iterative sizing design process according to an embodiment.

FIG. 15 depicts an iterative sizing design process 1550 based upon sensitivities according to an embodiment. The process 1550 accounts for the design response (DRESP) of the Maximum Local Relative mass or the Maximum Local Absolute mass in sizing optimization for the objective function of the constraints. The iterative design process scheme 1550 can be implemented, for example, in a predefined workflow of a computer-aided engineering (CAE) system. The method 1550 begins at step 1501 with creating an initial model that includes the various loading and boundary conditions for the equilibriums, for the optimization. In an embodiment, the model is defined by a designer. The model is then subjected to an iterative sizing design process through the steps 1501-1515.

Each design iteration cycle determines the design responses of the model at step 1503 by solving the equilibriums of the model. Further, the method 1550, at step 1507, determines the Maximum Local Relative mass and/or the Maximum Local Absolute mass as design responses.

The method 1550 then calculates consistent analytical sensitivities at steps 1505 and 1509 with respect to the sizing design variables for the design responses determined at steps 1503 and 1507, respectively. A design response defines a response for the current analysis model of a given optimization iteration. Thereby, a design response extracts one scalar value which can be a direct measure from the model (e.g., mass, center of gravity, etc.) or is determined by the results of the primal solutions for the equilibriums of the model (e.g., stresses, displacements, reaction forces, etc.).

The design responses are then applied to define an optimization problem consisting of constraints which have to be fulfilled and an objective function which is optimized. The optimization problem is solved using mathematical programming at step 1511. The mathematical programming, i.e., optimization computation, is strictly based upon the values of the user defined design targets, design responses, and the sensitivities of the design responses. Thus, if the design responses and sensitivities of the Maximum Local Relative mass or/and the Maximum Local Absolute mass are included in the iterative sizing design process then these enforce a local control of the design patterns on the design sizing surfaces and at the same time also enhance physical properties for the other design responses applied in the optimization setup.

In mathematics, computer science, and operations research mathematical programming is alternatively named mathematical optimization or simply optimization and is a process of the selection of a best solution (with regard to some criterion) from some set of available alternatives. Embodiments of the method 1550 may use any such mathematical programming as is known in the art.

After the mathematical programming at step 1511, a new physical model for the next optimization iteration is generated at step 1513 based upon the design variables determined at step 1511. The iterative design process is a process of the selection of a new improved solution (with regard to some objective and constraints) per optimization iteration. Frequently, the design variables determined at step 1511 and the physical model variables that are updated at step 1513 are the same, as for example elemental thickness design variables for sizing optimization. If the physical model variables and design domain variables are the same, the physical model at step 1513 is simply obtained as an output of the mathematical programming. Otherwise an additional step is necessary to interpret the design variables as physical model variables through the use of filters, as known in the art.

To continue, it is determined if the optimization is converged. If the optimization has not converged, a new optimization cycle is started and the method 1550 returns to steps 1503 and 1507. If the optimization has converged, a final design is created at step 1515. For the converged design, the constraints for the design responses should be fulfilled and the objective function should be optimized.

The method 1550 and its output final design 1515 can be employed for a variety of real-world objects to determine optimized designs for manufacturing. Two practical examples are milling designed rib-enforced shell structures for aerospace as shown FIGS. 16A-E. Optimized designs, such as those described hereinabove in relation to FIGS. 11-14 obtained using the iterative optimization processes described herein can, for example, represent typical designs for such manufactured aerospace milled rib-enforced shell structure types as shown in FIGS. 16A-E. For the designs in FIGS. 16A-E the milled ribs for the fuselage play a major role in the physical performance and characteristic of the fuselage shell structures when assembled in the full aerospace structure, e.g. for total mass, stiffness, strength, stability, robustness, etc. These ribs are traditionally determined using a trial and error design approach. However, embodiments of the present provide an iterative optimization approach that includes the maximum local relative mass or a maximum local absolute mass to yield local control of the design patterns of the reinforcing ribs for the milled surfaces.

To illustrate how principles of embodiments of the present invention can be employed, hereinbelow, an example implementation for designing a shell structure of an aerospace application is described.

Figure 16C:
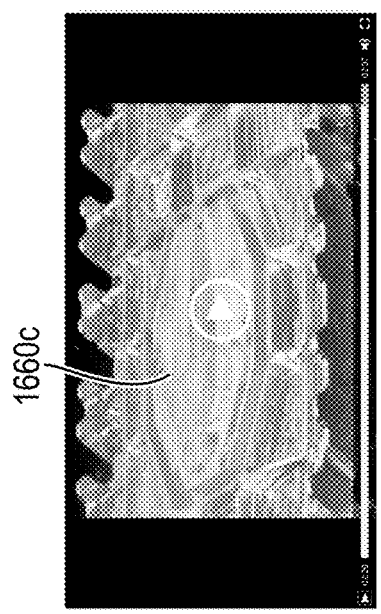
FIGS. 16A-E depict real-world aerospace applications in which embodiments may be employed.
Figure 16B:
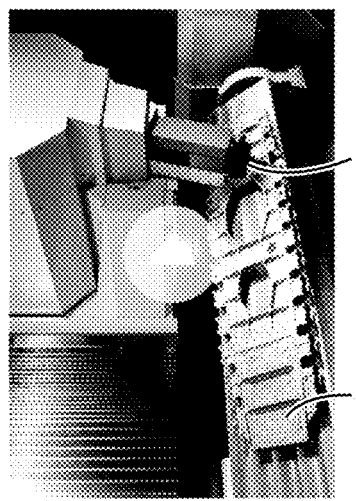
Figure 16A:
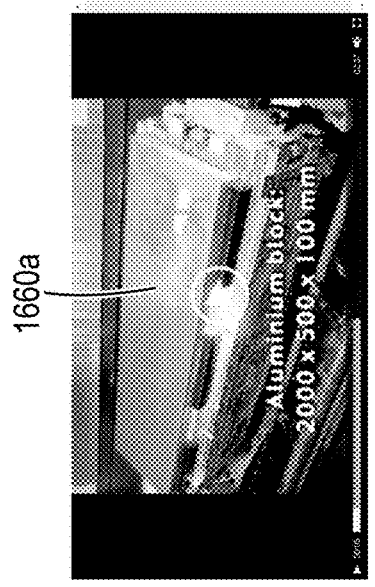
Figure 16E:
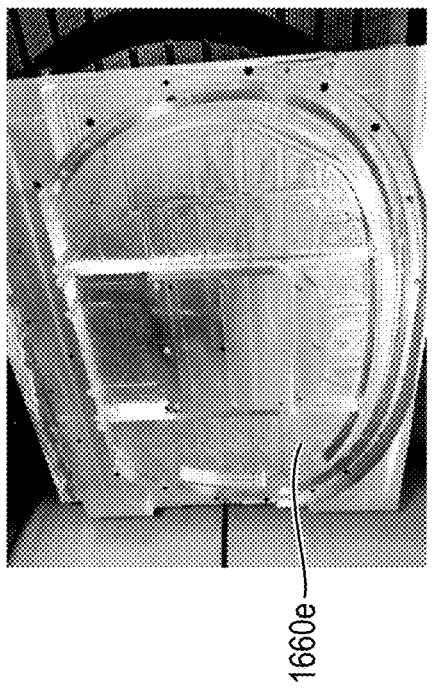
Figure 16D:

FIGS. 16A and 16D depict initial blocks 1660a and 1660d that can be milled to create a shell for an aerospace application, e.g., the outside of an airplane. The maximum initial block size of a given milling machine defines the maximum bound on the design variable thickness and the minimum bound on the design variable thickness depends upon the tool setup for the milling machine. Then, the ribs can be milled out of the initial blocks as shown in designs 1660b, 1660c and 1660e depicted in FIGS. 16B, 16C, and 16E, respectively. However, the question is how to optimize the design of these ribs so that the ribs comply with the physical requirements of the airplane, e.g., stresses, while still being able to be manufactured. Using embodiments of the present invention, the ribs can be designed for a given set of optimization requirements for when the milled component is assembled into the full aerospace structure with an additional maximum local relative mass constraint or a maximum local absolute mass constraint to control the design patterns of the ribs. In this way, embodiments address both the manufacturing process as well as design requirements of the full-assembled aerospace structure. For a given milling machine, e.g. the milling machine 1661 depicted in FIG. 16B, a minimum rib width can be manufactured, this minimum rib width can be used to define the radius, e.g., the radius 553, based upon the geometrical finite element model. Then the design of the ribs is optimized using the methods described herein, such as the method 660 described in relation to FIG. 6 or the method 1550 described in relation to FIG. 15. In such an implementation, the stiffness of the loading points of the structure is maximized and the local rib design is addressed. Then, the final optimized rib design fulfilling the milling manufacturing constraints as well as robustness requirements is determined. It is noted that while the aforementioned description considers milling processes, embodiments may be used to determine optimized designs for any variety of manufacturing processes, such as additive manufacturing.

To illustrate designing an aerospace structure, such as the structure 1660*d* depicted in FIG. 16D, an example embodiment using the method 1550 is described hereinbelow. At step 1501 a finite element model is defined as well as the upper and lower bounds of a thickness design variable. These bounds may be driven by the size, controller, and tooling of the machine used for manufacturing. In this example, stiffness is the design response for the loading points of the structure and the stiffness is maximized while controlling the thickness. At step 1503 the finite model is solved to determine the equilibriums. At step 1505, the design responses and the sensitivities of the design responses with respect to thickness design variables are determined. In this way steps 1503 and 1505 compute the design responses and their sensitivities based upon the equilibriums of the finite element model. To continue, at step 1507, a minimum rib width which can be manufactured is used to define the radius in relation to the geometrical finite element model and at step 1509 the design responses and the sensitivities of the design responses with respect to thickness design variables are determined. Steps 1507 and 1509 compute the local mass design responses using strictly the geometrical description of the finite element model but not state variables like for stiffness and strength obtained from solving the equilibriums. To continue, at 1511 the design responses and sensitivities of 1505 and 1509 are applied in mathematical programming (such as a Karush-Kuhn-Tucker conditions based approach) which yields a new set of new thickness design variables for the optimization iteration. In turn, at step 1511 the thicknesses in the virtual finite element model are updated. To continue, is the resulting thicknesses yields a non-converged design and if the changes in the design responses or the design thicknesses are still significant compared to the previous optimization iteration then, the method continues to steps 1503 and 1507 with the present new updated thickness design layout. If the design is converged, a final design 1515 with optimized thickness distribution is achieved.

Figure 17:
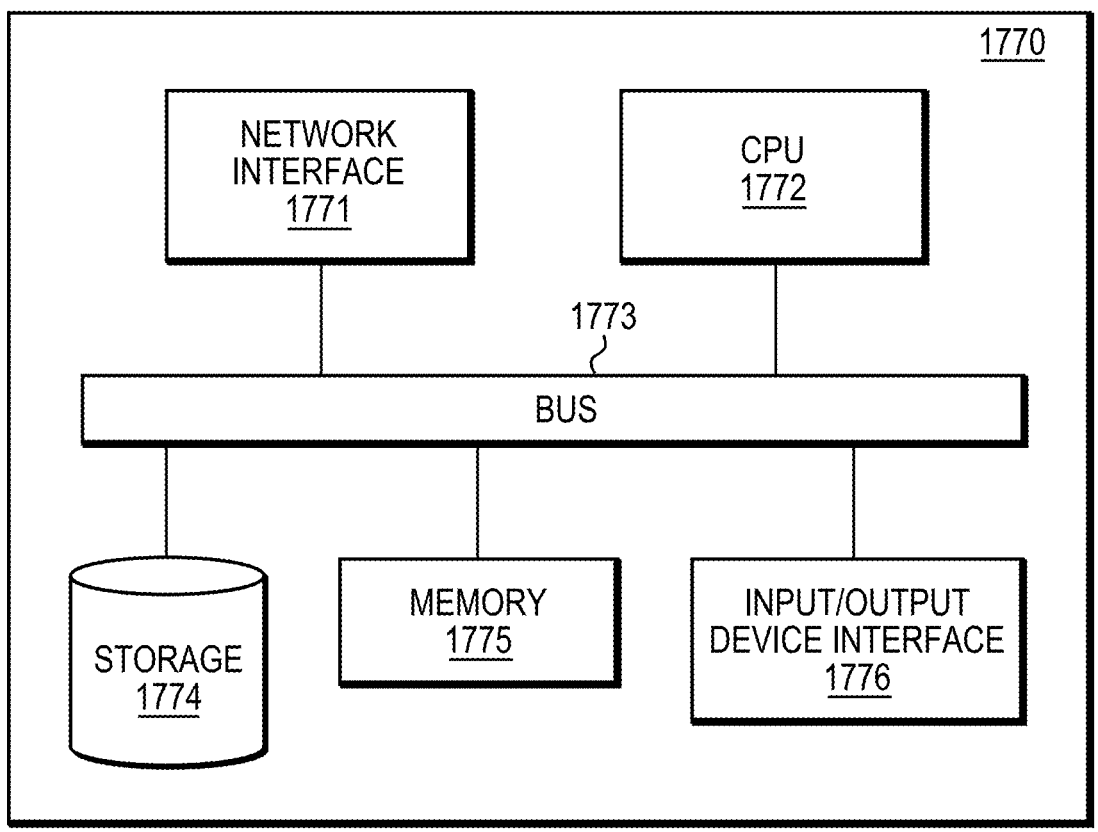
FIG. 17 is a simplified block diagram of a computer system for automatically determining an optimized design for manufacturing a real-world object according to an embodiment.

FIG. 17 is a simplified block diagram of a computer-based system 1770 that may be used to determine an optimized design for manufacturing a real-world object according to any variety of the embodiments of the present invention described herein. The system 1770 comprises a bus 1773. The bus 1773 serves as an interconnect between the various components of the system 1770. Connected to the bus 1773 is an input/output device interface 1776 for connecting various input and output devices such as a keyboard, mouse, display, speakers, etc. to the system 1770. A central processing unit (CPU) 1772 is connected to the bus 1773 and provides for the execution of computer instructions implementing embodiments. Memory 1775 provides volatile storage for data used for carrying out computer instructions implementing embodiments described herein, such as those methods previously described in relation to FIGS. 6 and 15. Storage 1774 provides non-volatile storage for software instructions, such as an operating system (not shown) and embodiment configurations, etc. The system 1770 also comprises a network interface 1771 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 1770, or a computer network environment such as the computer environment 1880, described herein below in relation to FIG. 18. The computer system 1770 may be transformed into the machines that execute the methods described herein, for example, by loading software instructions into either memory 1775 or non-volatile storage 1774 for execution by the CPU 1772. One of ordinary skill in the art should further understand that the system 1770 and its various components may be configured to carry out any embodiments or combination of embodiments of the present invention described herein. Further, the system 1770 may implement the various embodiments described herein utilizing any combination of hardware, software, and firmware modules operatively coupled, internally, or externally, to the system 1770. Further, the system 1770 may be communicatively coupled to or be embedded within a manufacturing device so as to control the device to create a physical object as described herein.

Figure 18:
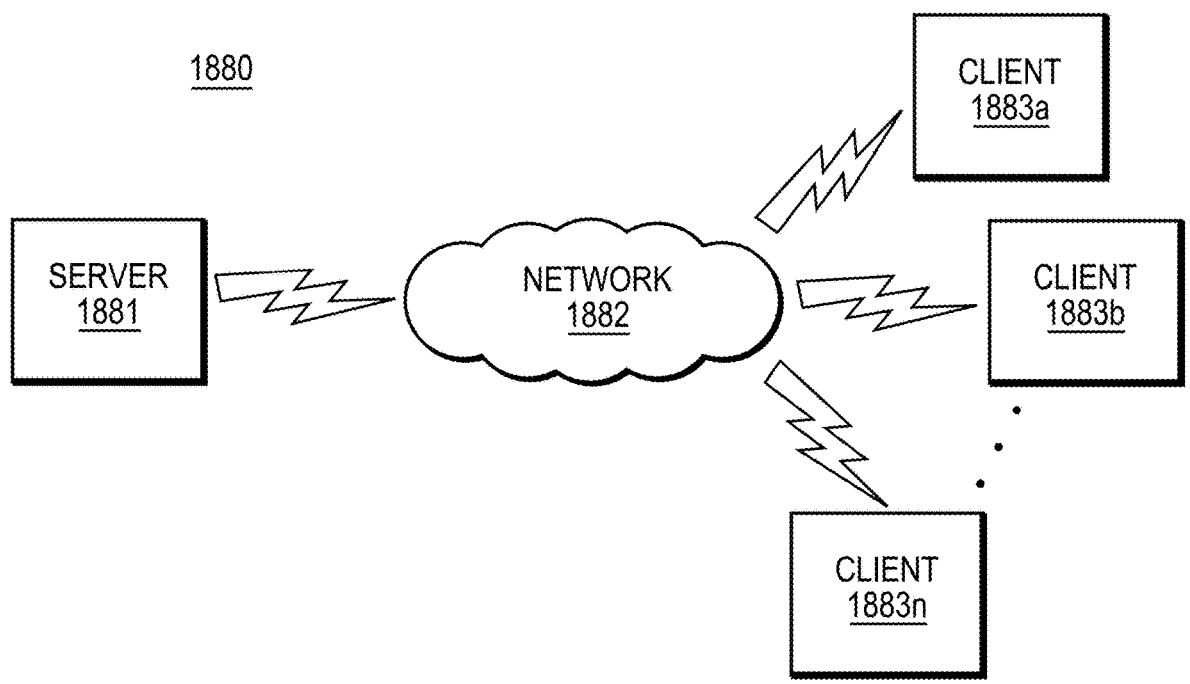
FIG. 18 is a simplified block diagram of a computer network environment in which an embodiment of the present invention may be implemented.

FIG. 18 illustrates a computer network environment 1880 in which an embodiment of the present invention may be implemented. In the computer network environment 1880, the server 1881 is linked through the communications network 1882 to the clients 1883*a-n*. The environment 1880 may be used to allow the clients 1883*a-n*, alone or in combination with the server 1881, to execute any of the methods described herein. For non-limiting example, computer network environment 1880 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method of automatically determining an optimized design for manufacturing a real-world object, the method comprising:
   defining, in memory of a processor, a finite element model representing a real-world object, the finite element model comprised of a plurality of elements;
   determining equilibriums and design responses of the real-world object in response to a set of boundary conditions using the finite element model, determining the design responses including calculating a local volume constraint for a given element of the plurality of elements of the finite element model wherein, the local volume constraint is a design response for the given element of the plurality of elements;
   determining design response sensitivities of the real-world object in response to the set of boundary conditions using the finite element model, determining design response sensitivities including differentiating the calculated local volume constraint to determine sensitivity of a sizing design variable for the given element;
   iteratively optimizing the finite element model representing the real-world object with respect to the sizing design variable using the determined equilibriums and the determined design responses, including the calculated local volume constraint, and the determined design response sensitivities, including the determined sensitivity of the sizing design variable, the iteratively optimizing resulting in an optimized value of the sizing design variable for the given element of the finite element model; and
   automatically updating properties of the given element of the finite element model to reflect the optimized value of the sizing design variable, thereby creating an optimized model of the real-world object for manufacturing.

2. The method of claim 1 where the finite element model is a sheet model of a surface of the real-world object.

3. The method of claim 1 further comprising:
   calculating a local volume constraint for each of multiple elements of the finite element model, each local volume constraint being a design response for a respective element of the plurality of elements;
   differentiating each calculated local volume constraint to determine sensitivity of the sizing design variable for each of the multiple elements;
   iteratively optimizing the finite element model using the determined equilibriums and the determined design responses, including the calculated local volume constraint for each of the multiple elements, and the determined design response sensitivities, including the determined sensitivity of the sizing design variable for each of the multiple elements, to determine an optimized value of the sizing design variable for each of the multiple elements; and
   automatically updating properties of each of the multiple elements to reflect the value of the sizing design variable determined for each of the multiple elements.

4. The method of claim 1 wherein the local volume constraint includes: a volume constraint, a material density constraint, and a material mass constraint.

5. The method of claim 1 wherein the sizing design variable represents at least one of:
   thickness;
   lattice structure; and
   cross-sectional dimensions.

6. The method of claim 1 wherein the local volume constraint applies to the given element and other elements of the finite element model within a radius surrounding the given element.

7. The method of claim 6 wherein the other elements are within the radius when elemental centroids of the other elements are within the radius.

8. The method of claim 1 further comprising:
   causing the real-world object to be manufactured according to the optimized model.

9. The method of claim 8 wherein causing the real-world object to be manufactured includes digitally communicating the optimized model of the real-world object to a manufacturing machine capable of producing the real-world object according to the optimized model.

10. A system to automatically determine an optimized design for manufacturing a real-world object, the system comprising:
    a processor; and
    a memory with computer code instructions stored thereon, the processor and the memory, with the computer code instructions being configured to cause the system to:
    define, in memory of a processor, a finite element model representing a real-world object, the finite element model comprised of a plurality of elements;
    determine equilibriums and design responses of the real-world object in response to a set of boundary conditions using the finite element model, determining the design responses including calculating a local volume constraint for a given element of the plurality of elements of the finite element model wherein, the local volume constraint is a design response for the given element of the plurality of elements;
    determine design response sensitivities of the real-world object in response to the set of boundary conditions using the finite element model, determining design response sensitivities including differentiating the calculated local volume constraint to determine sensitivity of a sizing design variable for the given element;
    iteratively optimize the finite element model representing the real-world object with respect to the sizing design variable using the determined equilibriums and the determined design responses, including the calculated local volume constraint, and the determined design response sensitivities, including the determined sensitivity of the sizing design variable, the iteratively optimizing resulting in an optimized value of the sizing design variable for the given element of the finite element model; and
    automatically update properties of the given element of the finite element model to reflect the optimized value of the sizing design variable, thereby creating an optimized model of the real-world object for manufacturing.

11. The system of claim 10 where the finite element model is a sheet model of a surface of the real-world object.

12. The system of claim 10 wherein the processor and the memory, with the computer code instructions, are further configured to cause the system to:
calculate a local volume constraint for each of multiple elements of the finite element model, each local volume constraint being a design response for a respective element of the plurality of elements;
differentiate each calculated local volume constraint to determine sensitivity of the sizing design variable for each of the multiple elements;
iteratively optimize the finite element model using the determined equilibriums and the determined design responses, including the calculated local volume constraint for each of the multiple elements, and the determined design response sensitivities, including the determined sensitivity of the sizing design variable for each of the multiple elements, to determine an optimized value of the sizing design variable for each of the multiple elements; and
automatically update properties of each of the multiple elements to reflect the value of the sizing design variable determined for each of the multiple elements.

13. The system of claim 10 wherein the local volume constraint includes: a volume constraint, a material density constraint, and a material mass constraint.

14. The system of claim 10 wherein the sizing design variable represents at least one of:
thickness;
lattice structure; and
cross-sectional dimensions.

15. The system of claim 10 wherein the local volume constraint applies to the given element and other elements of the finite element model within a radius surrounding the given element.

16. The system of claim 15 wherein the other elements are within the radius when elemental centroids of the other elements are within the radius.

17. The system of claim 10 wherein the processor and the memory, with the computer code instructions are further configured to cause the system to:
cause the real-world object to be manufactured according to the optimized model.

18. The system of claim 10 wherein, in causing the real-world object to be manufactured, the processor and the memory, with the computer code instructions, are further configured to cause the system to:
digitally communicate the optimized model of the real-world object to a manufacturing machine capable of producing the real-world object according to the optimized model.

19. A non-transitory computer program product to automatically determine an optimized design for manufacturing a real-world object, the computer program product executed by a server in communication across a network with one or more clients and comprising:

a computer readable medium, the computer readable medium comprising program instructions which, when executed by a processor, causes the processor to:
define, in memory of a processor, a finite element model representing a real-world object, the finite element model comprised of a plurality of elements;
determine equilibriums and design responses of the real-world object in response to a set of boundary conditions using the finite element model, determining the design responses including calculating a local volume constraint for a given element of the plurality of elements of the finite element model wherein, the local volume constraint is a design response for the given element of the plurality of elements;
determine design response sensitivities of the real-world object in response to the set of boundary conditions using the finite element model, determining design response sensitivities including differentiating the calculated local volume constraint to determine sensitivity of a sizing design variable for the given element;
iteratively optimize the finite element model representing the real-world object with respect to the sizing design variable using the determined equilibriums and the determined design responses, including the calculated local volume constraint, and the determined design response sensitivities, including the determined sensitivity of the sizing design variable, the iteratively optimizing resulting in an optimized value of the sizing design variable for the given element of the finite element model; and
automatically update properties of the given element of the finite element model to reflect the optimized value of the sizing design variable, thereby creating an optimized model of the real-world object for manufacturing.

20. The non-transitory computer program product of claim 19 wherein the computer readable medium further comprises program instructions which, when executed by the processor, causes the processor to:
calculate a local volume constraint for each of multiple elements of the finite element model, each local volume constraint being a design response for a respective element of the plurality of elements;
differentiate each calculated local volume constraint to determine sensitivity of the sizing design variable for each of the multiple elements;
iteratively optimize the finite element model using the determined equilibriums and the determined design responses, including the calculated local volume constraint for each of the multiple elements, and the determined design response sensitivities, including the determined sensitivity of the sizing design variable for each of the multiple elements, to determine an optimized value of the sizing design variable for each of the multiple elements; and
automatically update properties of each of the multiple elements to reflect the value of the sizing design variable determined for each of the multiple elements.

* * * * *